US012623647B2

(12) United States Patent
Leiber et al.

(10) Patent No.: US 12,623,647 B2
(45) Date of Patent: May 12, 2026

(54) BRAKING SYSTEM, AND VALVE WITH ACTIVATABLE HOLDING FORCE

(71) Applicant: IPGATE AG, Pfäffikon/Sz (CH)

(72) Inventors: Heinz Leiber, Oberriexingen (DE); Anton Van Zanten, Ditzingen (DE)

(73) Assignee: IPGATE AG, Pfaffikon (CH)

( * ) Notice: Subject to any disclaimer, the term of this patent is extended or adjusted under 35 U.S.C. 154(b) by 260 days.

(21) Appl. No.: 18/690,627

(22) PCT Filed: Aug. 23, 2022

(86) PCT No.: PCT/EP2022/073463
§ 371 (c)(1),
(2) Date: Mar. 8, 2024

(87) PCT Pub. No.: WO2023/036607
PCT Pub. Date: Mar. 16, 2023

(65) Prior Publication Data
US 2024/0375625 A1     Nov. 14, 2024

(30) Foreign Application Priority Data

Sep. 9, 2021    (DE) ..................... 20 2021 105 878.1

(51) Int. Cl.
| *B60T 13/68* | (2006.01) |
| *B60T 13/66* | (2006.01) |
| *B60T 13/74* | (2006.01) |

(52) U.S. Cl.
CPC .......... *B60T 13/662* (2013.01); *B60T 13/686* (2013.01); *B60T 13/745* (2013.01);
(Continued)

(58) Field of Classification Search
CPC .... B60T 13/662; B60T 13/686; B60T 13/745; B60T 2270/82; B60T 2270/406; B60T 2270/40
See application file for complete search history.

(56) References Cited

U.S. PATENT DOCUMENTS

2012/0126610 A1* 5/2012 Nakata ................... B60T 13/686
303/9.63
2014/0225425 A1 8/2014 Drumm et al.
(Continued)

FOREIGN PATENT DOCUMENTS

| DE | 102011118365 A1 | 5/2013 |
| DE | 102012020010 A1 | 4/2014 |
(Continued)

OTHER PUBLICATIONS

Search Report issued May 18, 2022 in DE Application No. 102021123421.2.
(Continued)

*Primary Examiner* — Jacob M Amick

(74) *Attorney, Agent, or Firm* — Naschitz, Brandes, Amir & Co.; Jeffrey W. Gluck

(57) ABSTRACT

A brake system may include at least two wheel brake cylinder of separate wheel circuits, at least one pressure supply to provide pressure in the wheel brake cylinders, at least one reservoir, at least one electronic control and regulating unit, and switching valves arranged to connect and disconnect respective hydraulic lines connected to the respective wheel brake cylinders to/from at least one main hydraulic line coupled to the pressure supply(s). Leakage diagnostics of the individual wheel circuits and/or other components of the brake system may be carried out. The switching valves may include an electromagnetic drive and a force-adding device for operation of the valves.

45 Claims, 10 Drawing Sheets

Testing During Braking

Figure 1:
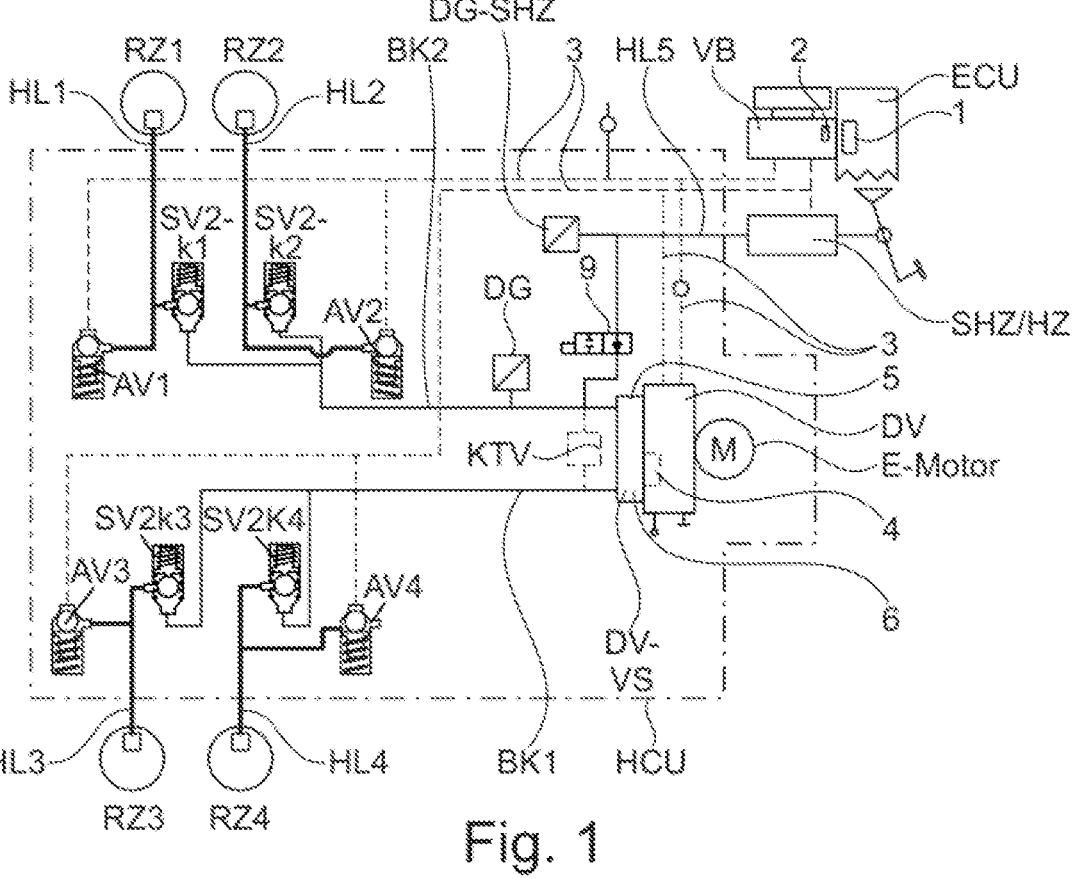

(52) U.S. Cl.
CPC ..... *B60T 2270/40* (2013.01); *B60T 2270/406*
(2013.01); *B60T 2270/82* (2013.01)

(56) References Cited

U.S. PATENT DOCUMENTS

| | | | |
|---|---|---|---|
| 2015/0028667 A1 | 1/2015 | Leiber et al. | |
| 2015/0203083 A1* | 7/2015 | Miyazaki | ................. B60T 8/36 |
| | | | 60/545 |
| 2016/0185328 A1* | 6/2016 | Hattori | ............... B60T 8/17558 |
| | | | 701/70 |
| 2020/0047734 A1 | 2/2020 | Foitzik et al. | |
| 2020/0070797 A1 | 3/2020 | Plewnia et al. | |
| 2020/0172067 A1* | 6/2020 | Einig | ..................... B60T 8/409 |
| 2020/0406880 A1 | 12/2020 | Zimmermann et al. | |
| 2021/0331654 A1 | 10/2021 | Stahr et al. | |

FOREIGN PATENT DOCUMENTS

| | | |
|---|---|---|
| DE | 102016208966 A1 | 11/2017 |
| DE | 102017000472 A1 | 7/2018 |
| DE | 102017219598 A1 | 7/2018 |
| DE | 102017212084 A1 | 1/2019 |
| DE | 102018212016 A1 | 1/2020 |
| DE | 102018213306 A1 | 2/2020 |
| WO | 2012146461 A1 | 11/2012 |
| WO | 2020165296 A1 | 8/2020 |

OTHER PUBLICATIONS

International Search Report and Written Opinion issued Mar. 24, 2023 in PCT/EP2022/073463 (translation of ISR only).

* cited by examiner

Testing When Vehicle is Stationary

Testing During Braking

Fig. 4 c1-c3

BRAKING SYSTEM, AND VALVE WITH ACTIVATABLE HOLDING FORCE

CROSS-REFERENCE TO RELATED APPLICATION

This application is a Section 371 of International Application No. PCT/EP2022/073463, filed Aug. 23, 2022, which was published in the German language on Mar. 16, 2023 under International Publication No. WO 2023/036607 A1, which claims priority under 35 U.S.C. § 119(b) to German Patent Application No. 20 2021 105 878.1, filed Sep. 9, 2021, the disclosures of which are incorporated herein by reference.

STATE OF THE ART

For almost 80 years, today's 2-circuit brake system with two brake circuits has become established for safety reasons and, depending on the vehicle design, is used in a brake circuit layout of
    a) diagonal and
    b) black/white or front axle/rear axle
applied. In the event of a brake circuit failure, the braking effect is reduced by 50% for a) and by up to approx. 70% for b). In the statistics, 10 ppm/J is calculated for a brake circuit failure. Due to the reduced braking effect or total brake failure, there is a considerable risk of accidents.

DE 10 20 2018 213 306 describes a system with detection of brake circuit failure due to leakage in the brake circuit by evaluating the pressure gradient.

Almost all vehicles have electronic brake control systems for all four vehicle wheels, which are usually hydraulically braked. Each wheel brake cylinder is connected to at least one or two electromagnetically controlled control valves, which are electrically controlled by an electrical control unit (ECU), e.g. to prevent the wheel from locking.

In today's standard brake systems with ABS/ESP function, each wheel brake cylinder is usually assigned an inlet and an outlet valve, whereby the inlet valve usually has a non-return valve connected in parallel so that the inlet valve, which is often also referred to as the switching valve, does not close due to the back pressure when the pressure is reduced quickly.

If an inlet valve with its associated non-return valve fails and leaks, an entire brake circuit usually fails in today's 2-circuit brake systems if the wheel brake cylinder fails, reducing the braking effect by at least 30%.

Object of the Invention

The object of the invention is to prevent the failure of an entire brake circuit if only one wheel circuit fails or leaks. By wheel circuit is meant here the wheel brake cylinder including its hydraulic connection to the valve, e.g. inlet valve, up to the wheel brake cylinder. Four-circuit brake system is understood here as a brake system in which, if one wheel circuit or two or three wheel circuits fail, the other three or two wheel circuits or one wheel circuit are still functional.

Advantages of the Invention

In order to achieve the above, as few failing components as possible must be used between the pressure feed, in the line connection to the output of the hydraulic control unit. These include, for example, solenoid or mechanically actuated valves. Ultimately, it is crucial that only a single valve in the "normally de-energized open" configuration is used at the end of the line connection from the pressure feed to the respective wheel brake cylinder. An inlet valve commonly used for ABS/ESP has a parallel non-return valve, which is considered unsafe in terms of tightness and can no longer be used. As described above, the non-return valve was provided so that the inlet valve does not close due to back pressure during rapid pressure reduction.

The valve SV2$k$ according to the invention is understood to be the valve assigned to a wheel brake cylinder, via which hydraulic medium flows to build up pressure in only this wheel brake cylinder. The wheel circuit is then understood here as the wheel brake cylinder including the hydraulic connection from the valve to the wheel brake cylinder. Of course, the hydraulic medium can also flow from the associated wheel brake cylinder through the valve SV2$k$ back into the brake circuit BK1 or BK2 to reduce the pressure.

To avoid the problems described above, the invention uses a valve SV2$k$ or a switching valve of the "normally de-energized open" type, the valve actuator of which is moved by means of a first electromagnetic actuator from the open valve position to the closed valve position, in which the valve actuator is pressed against a valve seat. If the electromagnetic actuator is not or not sufficiently energized, a valve spring presses the valve actuator into the initial position, i.e. into the open valve position. In the open valve position, the invention provides an additional force device that generates an additional force on the valve actuator, which is directed in the direction of the open valve position and thus supports or replaces the valve spring, resulting in an increased resultant force with which the valve actuator is force-loaded into the open valve position.

The additional force device can be switchable, e.g. formed by an additional electromagnet to the actual valve actuator. It can therefore also be described as an active additional force device, as the additional force generated on the valve actuator can be switched on or off as required, depending on the state of the brake system. However, it is also possible for the additional force device to act passively, e.g. by using a permanent magnet. It is also in the spirit of the invention if the additional force device has an electromagnet and a permanent magnet. In all the embodiments described above, a force supporting the valve spring is advantageously exerted on the valve actuator by means of the additional force device in order to hold it in its open position so that the valve does not close unintentionally.

With a merely active additional force device, to close the valve SV2$k$ its drive only has to act against the force of the valve spring, which can be dimensioned smaller due to the switchable additional force device, so that the valve SV2$k$ closes reliably and tightness is ensured by a high contact pressure force.

With a purely passive additional force device, the actual actuator of the SV2$k$ valve only has to apply an increased force at the start of the stroke movement from the open to the closed position in order to overcome the passive and therefore permanently acting additional force. As the air gap increases, the force of the passive additional force device will quickly decrease and have less of an effect in the closed position of the valve.

This is because the valve SV2$k$ is the safety gate for the brake circuits BK to the wheel brake cylinder RZ. If one of the four hydraulic connections from the hydraulic control unit to a wheel brake cylinder fails in the braking system according to the invention, or if the wheel brake cylinder leaks, the faulty hydraulic connection or the faulty wheel brake cylinder can be disconnected from the rest of the braking system with a high degree of safety by the valve SV2$k$ according to the invention.

The additional force device only needs to be switched on or act when a rapid pressure reduction is required. In all other operating states of the brake system, the additional holding or supporting force of the additional force device is not required, so that energy can be advantageously saved. Thus, in the braking system according to the invention, if one wheel circuit fails, only the braking effect of this one failed wheel circuit is lost, whereby the braking effect of the remaining three wheel circuits is still available. This results in only a reduction of the braking effect from four to three intact wheel circuits, so that in the event of the failure of one wheel circuit on the front axle, only approx. 35% loss of braking effect is recorded in contrast to 70%, as described above for a black/white brake circuit distribution, if an entire brake circuit and thus two wheel circuits always fail.

The valve described above is claimed both alone and in combination with the braking system described below. The braking system according to the invention described below should advantageously be equipped with the valve described above. However, it is also conceivable that the braking system according to the invention is operated with a different type of valve.

The braking system according to the invention thus has four wheel circuits, in each of which two wheel circuits are assigned to one brake circuit. If one wheel circuit fails, three wheel circuits are advantageously still available for the braking effect.

The functional reliability of the brake system according to the invention can be additionally increased in the case of dirt particles in the brake fluid by installing at least one filter with a small mesh size at the inlet and/or outlet of the valve. The mesh size should be selected so small that these small dirt particles only generate small leaks and thus only small flow rates when the valve SV2$k$ is closed, which can be compensated by the pressure supply, but which can be detected by the diagnostics both via the flow rate of the pressure supply and via the level in the reservoir.

In order to check the function of the SV2$k$ valve according to the invention, a measurement of the volume absorption and the temporal progression of the pressure in the respective wheel circuit and a comparison with the previously determined pressure-volume characteristic curve of the wheel circuit can be carried out during diagnosis, for example. The diagnosis can be carried out during each braking operation and/or also at standstill or during servicing.

As described above, the SV2$k$ valve does not require a non-return valve, but still meets a wide range of requirements. For example, it must remain securely open in both directions even at high flow rates, i.e. the weak point typical of today's valves, i.e. that at high flow rates a force acts on the valve cone and valve spring due to effects on the valve seat and the valve closes automatically, must not occur.

Advantageously, the SV2$k$ valve can be optimized by a corresponding design of the sealing cone, the dimensions of the return spring and the valve tappet, in addition to the additional force device. In the closed position of the valve, which can also be called the inlet valve, but which can also be used to reduce the pressure in the wheel brake cylinder, the push-on force should be significantly lower than when using a progressive spring, which has a higher force in this position than in the open position, which is unfavorable for the dimensioning of the solenoid circuit due to the correspondingly higher force requirement.

The braking system according to the invention can have various valve circuits:

a) Four SV2$k$ valves for four wheel brake cylinders each, via which both the pressure build-up and the pressure reduction for the respective wheel brake cylinders are carried out;

b) four SV2$k$ valves, each for four wheel brake cylinders and two exhaust valves;

c) four SV2$k$ valves and four exhaust valves.

When using an outlet valve for a wheel circuit, it is possible to control the pressure build-up Pauf and pressure reduction Pab individually for each wheel. If a leak occurs in a wheel circuit, a diagnostic circuit can advantageously identify the faulty wheel circuit both during braking and parking and close the valve SV2$k$ belonging to the wheel circuit so that three wheel circuits are still available in the event of this single fault and two wheel circuits are available in the "worst case" in the event of a double fault, i.e. if two wheel circuits fail simultaneously. With conventional brake systems, on the other hand, a total brake failure occurs in the worst case.

In summary, it can therefore be stated that a high safety gain can be achieved with the SV2$k$ valve by making minor changes to the inlet valve and eliminating the non-return valve. If the SV2$k$ valve is designed accordingly, a cost reduction is possible in addition to the safety gain.

The braking system according to the invention can also be designed in such a way that instead of four hydraulic wheel circuits, a mixed hydraulic-electric braking system with, for example, hydraulic lines to the hydraulically operating front wheel brakes and only electrical connections to the electromotively operating brakes (EMB) on the rear axle, the design of which is known. Here too, the same advantages arise if the hydraulic wheel circuits are designed as described above.

In addition to the valve concepts described, different pressure supply concepts are also possible, e.g. a single pressure supply for level 2 of automated driving or two pressure supplies for level 3 to level 5 of automated driving, whereby the second, redundant, pressure supply can contain a piston pump or a rotary pump. The rotary pumps have a clear cost advantage. In the case of the piston pump, a simple non-return valve can be used at the outlet of the pressure supply instead of the solenoid valve, which has the same advantages in the event of a pressure supply failure and is more cost-effective. In this braking system, the pressure reduction during normal braking cannot take place via the control of the piston of the pressure supply, but via the control of the outlet valves using the pressure transmitter signal of the pressure transmitter or also the pressure transmitter. Since at least two outlet valves AV are used, there is also redundant pressure reduction. Depending on the requirement for the pressure reduction rate and the number of outlet valves AV, one, two or more outlet valves AV can be opened.

Solenoid valves can be provided to isolate the pressure supply from the brake circuits. However, it is also possible to dispense with such isolation valves if the pressure supply is provided with a drive with redundant winding circuitry, e.g. 2×3-phase and/or redundant control, in such a way that no further valves are provided between the switching valves SV2K$_{1-4}$ assigned to the wheel circuits and the pressure supply DV. In order to prevent a failure of the brake system, e.g. due to a leaking piston seal or small piston clearance, compensation is achieved by means of additional delivery.

The advantage of the brake systems described above is that the usual vehicle tuning in various areas such as logistics, service and homologation can be dispensed with.

FIGURE DESCRIPTION

Various possible embodiments of the braking system according to the invention and the valves used are explained in more detail below with reference to drawings.

Figures 2, 2A, 2B, 2C:
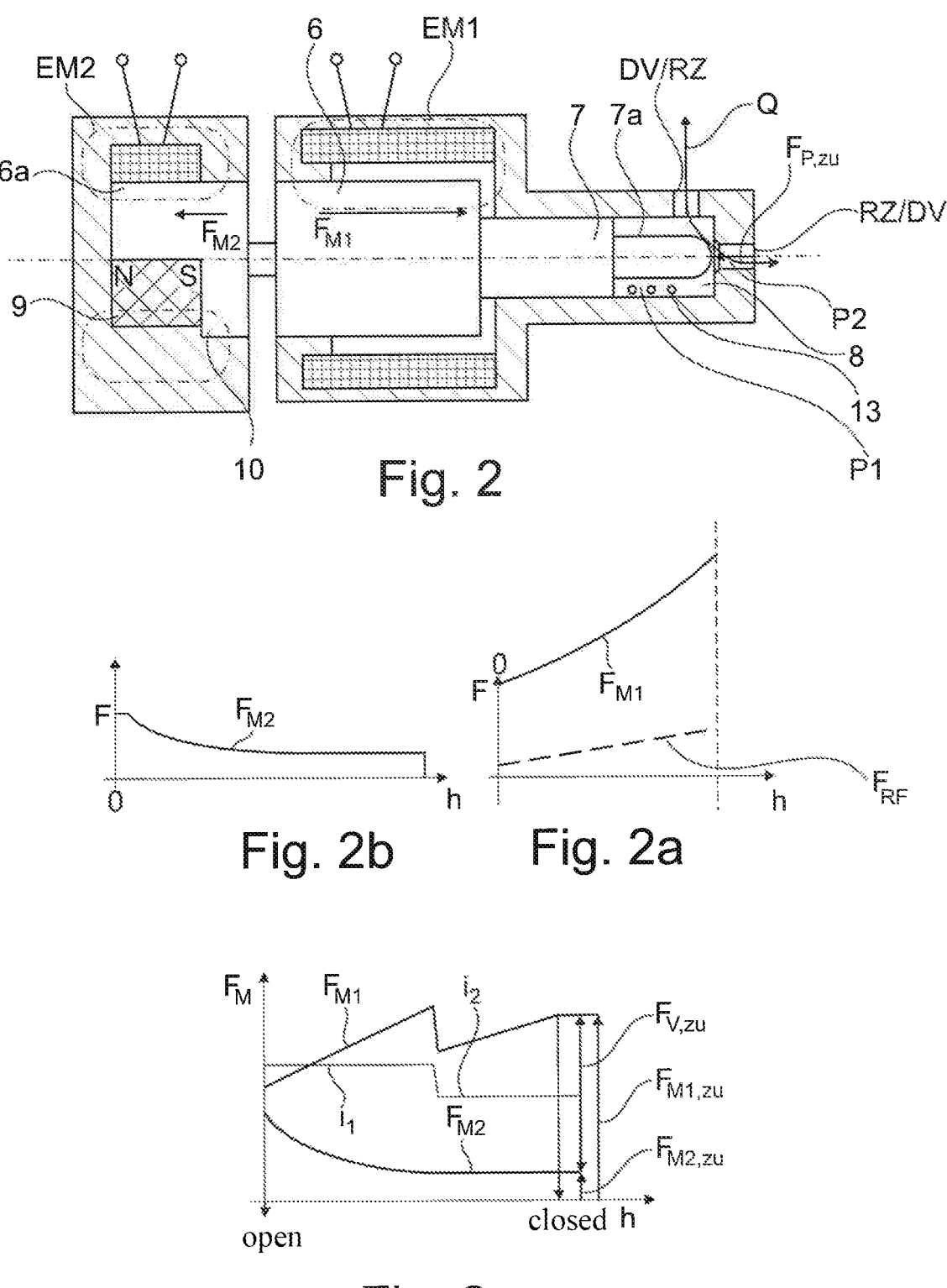

It shows:

FIG. 1: shows the structure of a braking system according to the invention with four hydraulic wheel brakes, which are connected to the hydraulic unit via four hydraulic lines, whereby the hydraulic unit has additional valves SV2$k$ in addition to the four valves according to the invention assigned to the wheel brakes;

FIG. 1$a$: shows a typical brake pressure curve in an ABS control cycle;

FIG. 1$b$: shows the design of a mixed brake system with hydraulically actuated brakes on the front axle and electrically actuated brakes on the rear axle;

FIG. 2: shows the basic design of a valve SV2$k$ with an additional force device;

FIG. 2$a$: shows the force curve of the additional force device over the valve armature stroke;

FIG. 2$b$: shows the force curve of the electromagnetic valve force and the force of the return spring over the valve armature stroke;

FIG. 2$c$: shows the electrical valve current during current control, the force curve of the electromagnetic valve force during current control and the force of the additional force device over the valve armature stroke;

FIG. 2$d$: shows the valve SV2$k$ according to FIG. 2 as a modification of a standard valve;

FIGS. 3$a$ to 3$d$: Various possible valve circuits for the braking system according to the invention with four wheel circuits;

FIG. 4$a$: a diagnostic sequence during braking for the braking system according to the invention;

FIG. 4$b$: A diagnostic sequence during vehicle standstill;

FIG. 4$c$: A diagnostic sequence for a leak in a wheel brake cylinder and a leak in the SV2$k$ valve.

FIG. 4$d$: a first alternative diagnostic sequence for individual faults during braking or when the vehicle is stationary for the braking system according to the invention;

FIG. 4$e$: a second alternative diagnostic sequence for individual faults during braking or when the vehicle is stationary for the braking system according to the invention;

FIG. 4$f$: a diagnostic sequence based on the first alternative diagnostic sequence for double faults during braking or during vehicle standstill for the braking system according to the invention;

FIG. 1 shows the simplified structure of a braking system according to the invention with four wheel circuits with the hydraulic connections HL1-HL4 between the wheel brake cylinders RZ1-RZ4 and the valves SV2$k$1-SV2$k$4. Here, for example, wheel circuit 1 consists of wheel brake cylinder RZ1 and hydraulic line HL1. The exhaust valves can be provided optionally, whereby one, two or even four exhaust valves can be provided. The hydraulic connections between the optional exhaust valves AV and the reservoir VB are shown as dashed lines. The valves SV2$k$ have a hydraulic connection to the pressure supply DV via the brake circuits BK1 and BK2. The brake circuits BK1 and BK2 can optionally be connected to each other via a de-energized, open circuit isolating valve KTV, which is shown in more detail in FIG. 3$a$-FIG. 3$c$ with the designation BP1. For safety reasons, this circuit separating valve KTV can also be designed as a 3/2-way valve, whereby the pressure supply DV is connected to one connection of the valve and the other two connections are connected to the two brake circuits, so that the pressure supply can be connected to one or the other brake circuit BK1 or BK2 as required. As is known, piston pumps with so-called unstepped single-stroke pistons and stepped pistons as double-stroke pistons with forward and return stroke are used as pressure supply DV. The pressure supply DV with single-stroke pistons has only one pressure outlet, while the pressure supply DV with double-stroke pistons has two pressure outlets. A pressure supply DV with only one pressure outlet can be formed, for example, by a motor-driven piston-cylinder unit with only one pressure chamber or, for example, by a rotary pump. A pressure supply DV with two pressure outlets can be formed, for example, by a motor-driven double-stroke piston pump with two pressure chambers, in which case each pressure or working chamber is connected to or forms an outlet. The DV pressure supply with double-stroke pistons is advantageously used for continuous pumping and also has advantages in the event of a fault in the four-circuit brake system for subsequent pumping to compensate for leaks. The DV pressure supply with double-stroke piston requires a valve circuit for the forward and return stroke. Both piston types also optionally use the KTV circuit separation valve to separate the two brake circuits BK1 and BK2. In the four-circuit braking system with SV2$k$ as the safety valve and in the safe n-circuit braking system, the KTV circuit separation valve and the dual-circuit feed from the DV pressure supply can be dispensed with. With the advantages in the safety of valve SV2$k$ in the event of failure of a wheel circuit RK1, . . . , RK4, the valve KTV can be dispensed with if there is no double fault safety, e.g. leakage of wheel brake cylinder 1 and leakage of valve SV2$k$1.

If a pressure supply with only one output is used, the valve KTV is used to either connect the pressure supply to the brake circuits BK1 and BK2 or to disconnect it from them. If, on the other hand, a pressure supply with two outputs is used, a brake circuit BK1 or BK2 is connected to each output of the pressure supply DV, whereby the circuit isolating valve KTV is then used to selectively connect or disconnect the two brake circuits BK1 and BK2, as shown in FIG. 1. The pressure supply DV preferably has an EC motor with one or two phases and a corresponding number of winding controls, so that redundant operation is ensured. One or two pressure sensors DG can be provided to determine the ACTUAL pressure, Pist, in the two brake circuits BK1, BK2. The master brake cylinder can be designed either as a single master brake cylinder SHZ or as a tandem master brake cylinder THZ, via which pressure can be generated by means of the brake pedal in the event of failure of the pressure supply DV. The reservoir VB can be connected or arranged on the master brake cylinder HZ, which has a float with a sensor target 2 arranged on it, whereby a sensor element 1 is provided in the control and regulation unit ECU in order to detect the fill level of the reservoir.

FIG. 1$a$ shows the typical brake pressure curve $P_{RZ}$ during a standard ABS control cycle in a wheel brake cylinder. At time 1, after a brake pressure reduction due to unstable wheel slip, the brake pressure is kept constant until time 2 so that stable wheel slip can be achieved. At time 2, stable wheel slip is reached and the brake pressure is increased quickly, i.e. with a large gradient, with the aim of quickly returning to the maximum braking force between the tire and the road surface. At time 3, the braking force is just below the maximum braking force between the tire and the road surface. The braking pressure is now increased slowly, i.e. with a small gradient, so that the braking force remains close to the maximum braking force between the tire and the road for a long time. At time 4, the braking force between the tire and the road has dropped despite the increasing brake pressure. The wheel decelerates sharply, the wheel slip is unstable and the pressure is reduced by opening the exhaust valve AV. Between points in time 4 and 5, the brake pressure must be reduced very quickly, i.e. with a large gradient, as the wheel slip is unstable in this time period and can increase very quickly. At time 5, the wheel accelerates again, whereby the pressure is kept constant so that stable wheel slip can occur again. At time 6, stable wheel slip is achieved and the brake pressure can be increased again. The small brake pressure gradient between points in time 3 and 4 is achieved with an electric current control or current control of the SV2$k$ valves. The valve connections as shown in FIG. 1 are absolutely essential for this. The brake pressure gradient between points in time 4 and 5 depends on the brake pressure in the wheel brake cylinder, i.e. when the pressure in the wheel brake cylinder $P_{RZ}$ is high, the gradient is large and when the pressure in the wheel brake cylinder $P_{RZ}$ is low, the gradient is small. At low brake pressures in the wheel brake cylinder, e.g. $P_{RZ}$=10 bar, the hydraulic resistance of the outlet valve AV should be low for a large gradient. For high brake pressures in the wheel brake cylinder, e.g. $P_{RZ}$=100 bar, the gradient should not be too large and the hydraulic resistance of the exhaust valve AV should be greater for precise pressure adjustment and low noise. This means that the hydraulic resistance of the exhaust valve can only ever be a compromise.

As already mentioned, the small gradient of brake pressure build-up in the wheel brake cylinder between points in time 3 and 4 is achieved with electrical current control or current regulation of the valves SV2$k$. For this purpose, the hydraulic connections of the valves SV2$k$, as shown in FIG. 1, e.g. SV2$k$1, are absolutely essential.

During gradient control of the brake pressure build-up in wheel brake cylinder RZ1, for example, the hydraulic resistance of valve SV2$k$1 is influenced by means of electrical current control or current regulation. When valve SV2$k$1 is open, volume flows from brake circuit BK1 into wheel brake cylinder RZ1 when brake pressure builds up in wheel brake cylinder RZ1. The volume flows through the narrow valve gap between the valve armature (ball in the figure of SV2$k$1) and the valve seat of valve SV2$k$1. As a result, the brake pressure upstream of the valve gap, i.e. on the side of the brake circuit BK1, is greater than downstream of the valve gap. This pressure difference acts on the valve armature, whereby a pressure differential force is exerted on the valve armature, which acts in the direction of the valve opening. If the valve SV2$k$1 is energized, a magnetic force is created on the valve armature in the direction of the closed position of the valve. This magnetic force causes the armature to move in the direction of valve closing and the valve gap becomes smaller, which reduces the volume flow and thus the pressure build-up gradient in wheel brake cylinder RZ1. The greater the electric current on the valve SV2$k$1, the smaller the brake pressure build-up gradient in wheel brake cylinder RZ1. In this way, the brake pressure build-up gradient in wheel brake cylinder RZ1 can be influenced by current control or current regulation of valve SV2$k$1.

FIG. 1$b$ shows a mixed brake system with hydraulically actuated brakes on the front axle and electrically actuated brakes EMB on the rear axle. The hydraulic circuit of the front axle with the SV2$k$ valves is identical to the embodiment shown in FIG. 1, with simple connections to the pressure supply DV. An additional isolating valve to the single master cylinder SHZ is arranged in the connecting line HL5, which can also be provided in the embodiment shown in FIG. 1. This valve is closed during normal operation. The pressure supply DV is driven by an EC motor, which is preferably driven redundantly via a 2×3 phase winding control. This means that approx. 70% of the braking effect can still be provided in the event of a single fault in a winding.

FIG. 2 shows the special valve SV2$k$ required for the embodiments described above, which functions reliably in both flow directions, i.e. even with large flow rates, e.g. 100 cm$^3$/s-120 cm$^3$/s, and large pressure differences across the valve, e.g. 160 bar-220 bar. In particular for the range described above, this valve SV2$k$ ensures that it does not close automatically. The valve SV2$k$ according to the invention has the typical structure of a solenoid valve with electromagnetic circuit EM1 with armature 6, valve actuator or valve plunger 7 and valve seat 8 as well as the return spring 13. The return spring 13 can be dispensed with if the additional force device, which is formed by the electromagnetic circuit EM2 in FIG. 2, is designed accordingly. The valve actuator EM1 generates (see FIG. 2$a$) a strong progressive force FM1 over the stroke h and the return spring 13 generates a progressive return force FRF over the stroke h to reset the armature. In the left-hand part of FIG. 2, the armature 6 is coupled to a second force-generating element, which forms the additional force device according to the invention. This can consist of a second electromagnetic circuit EM2 with armature 6$a$, whose switchable force FM2 counteracts the force FM1 of the first magnetic circuit EM1. As a more cost-effective variant, a permanent magnetic circuit can also be used as a passive additional force device, consisting of a small permanent magnet 9 with pole plate 10. The force effect of FM2 counteracts FM1 and acts with a relatively strong force when the valve is open with a strong desired drop in force over the stroke h. The force FM2 (see FIG. 2$b$) is still large enough at the end of the stroke to take over the usual armature return and can therefore replace the usual return spring 13. FIG. 2$c$ shows the interaction of the force sources FM1 as a function of the current and FM2 at the permanent solenoid. In the closed valve position, the pressure difference P2-P1 acts on the valve seat with the force FP, which is directed towards the valve opening when the pressure P2 is greater than the pressure P1. In the open valve position, the described hydraulic force FH acts on the valve seat due to the volume flow Q through the valve, which can close the valve without countermeasures, both during pressure build-up Pauf and during pressure reduction Pab, depending on how the valve SV2$k$ is connected to the pressure supply DV and the wheel brake cylinders RZ, and depending on the direction in which the volume flow runs, which is explained in more detail in FIGS. 3 to 3$b$ below.

The hydraulic force on the valve armature FH, which acts when flow Q flows through the valve, always acts in the open position of the valve. For this reason, the force of the additional force device FM2 should act primarily in this position and therefore, due to the decreasing force of FM2 over the armature movement in the direction of the closed valve, it can be dimensioned higher in the open position than when using a spring with increasing force FRF during the armature movement in the direction of closing the valve.

The valve tappet 7 can also have a special shape that provides the counter-force through hydraulic flow forces and can reduce the closing force.

FIG. 2$c$ shows the electrical control of valve i. The current i1 is selected in the closed valve position so that FM1 is greater than FM2. The current can then be varied in the closed position of the valve, i2, depending on the hydraulic differential pressure P2-P1 across the valve. As the force FM2 in this position is in the range of the usual spring force for the reasons described, the valve can also be operated with a current control or current regulation, for example. To keep the valve in the closed position, the differential force $$FV, zu = FM1, zu - FM2, zu$$

must be greater than the force FP resulting from the differential pressure P2-P1 across the valve in the closed position.

Figure 2D:
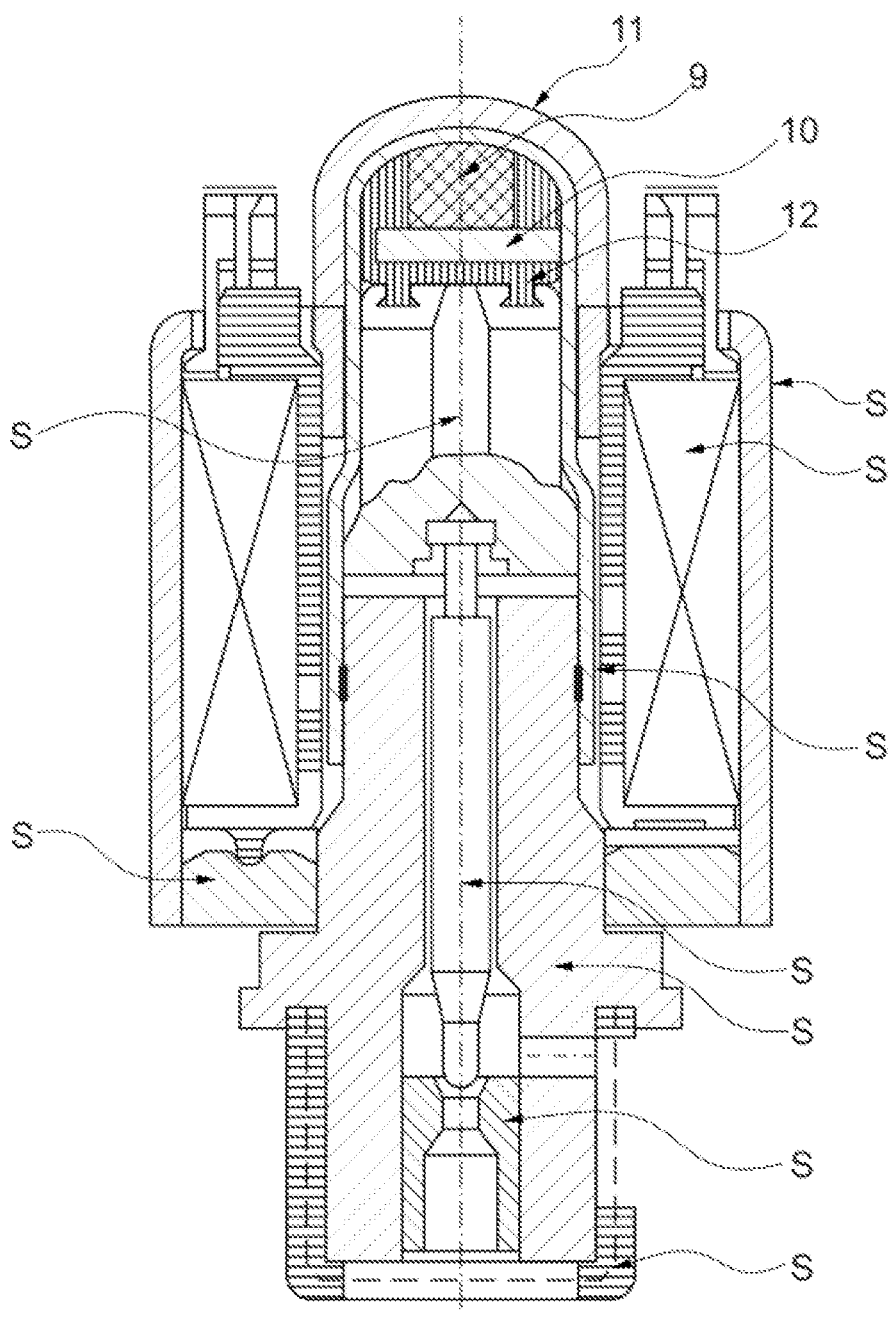

FIG. 2d shows the design of the SV2k switching valve according to the invention based on a series inlet valve. The corresponding parts in the series part are all labeled S. The non-return valve integrated in the series valve is omitted. Only four additional parts are required for the additional force device. These are 1. The permanent magnet 9
2. the pole plate 10
3. the electromagnetic inference 11 and
4. a plastic body 12, which connects the parts together, including the anchor.

Figures 3A, 3B, 3C:
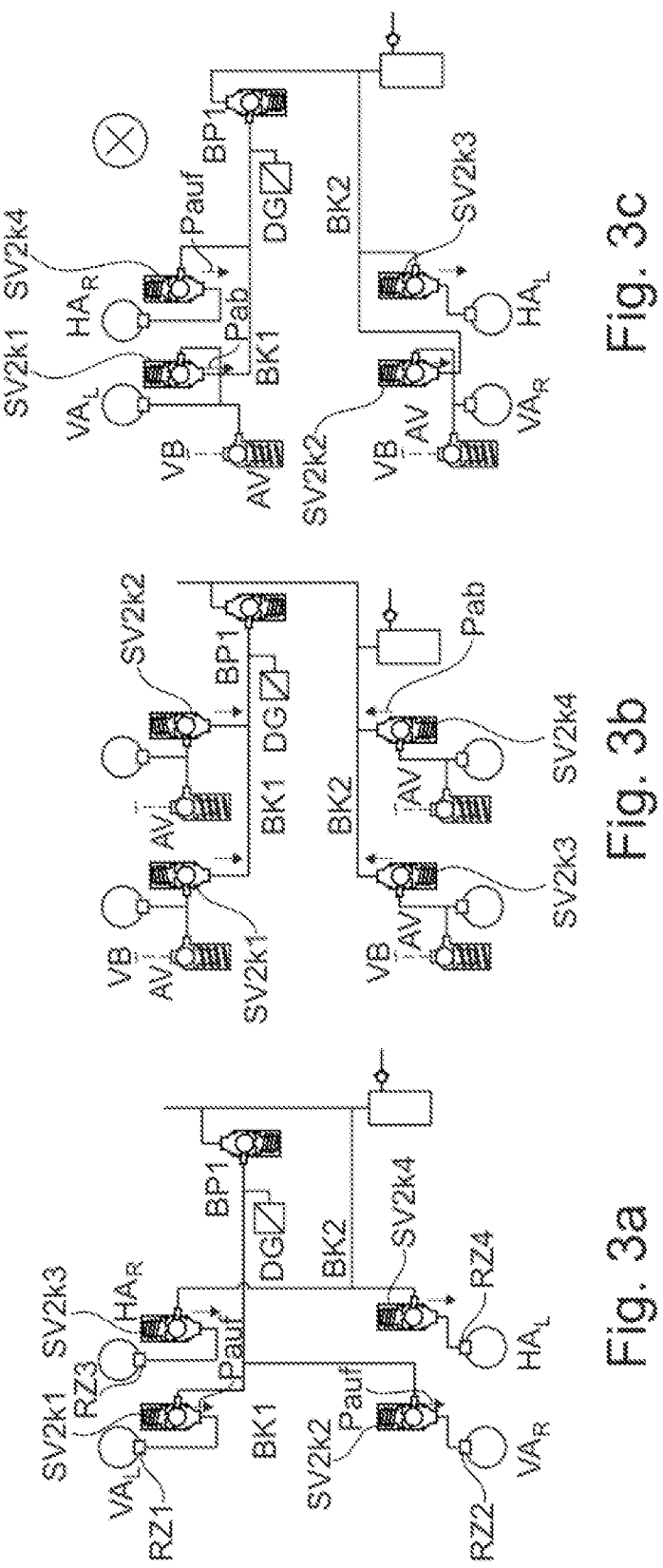

FIGS. 3a-3d show various valve circuits for the ABS/ESP functions, which are dependent on the pressure control system for pressure build-up Pauf and pressure reduction Pab. The respective embodiments differ in the number of valves, whereby the differentiating feature is the outlet valve AV and thus the pressure reduction control. The arrows show the volume flows at which there is a risk of the valve SV2k1, . . . , SV2k4 closing. Closing or tearing of the valve is understood to mean the automatic closing of the de-energized open valve by a volume flow through the valve. As an example, FIG. 3a shows the pressure build-up Pauf in wheel brake cylinder 2, RZ2, in which hydraulic volume flows from the brake circuit BK1 through the open valve SV2k2 into the wheel brake cylinder 2, RZ2. When valve SV2$k_2$ is open, the volume flows through the narrow valve gap between the valve armature (ball in FIG. 2 of SV2$k_2$) and the valve seat. As a result, the brake pressure upstream of the valve gap is greater than downstream of the valve gap. This pressure difference acts on the valve armature, whereby a pressure differential force is exerted on the valve armature, which acts in the direction of valve closure. If this pressure differential force is greater than the force that the valve spring exerts on the valve armature, the valve closes, which is referred to as closing the valve by volume flow. This automatic closing is unintentional because the valve is not triggered to close.

Figure 1A:
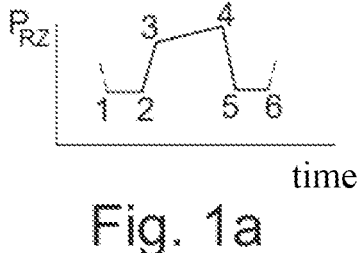
Figure 1B:
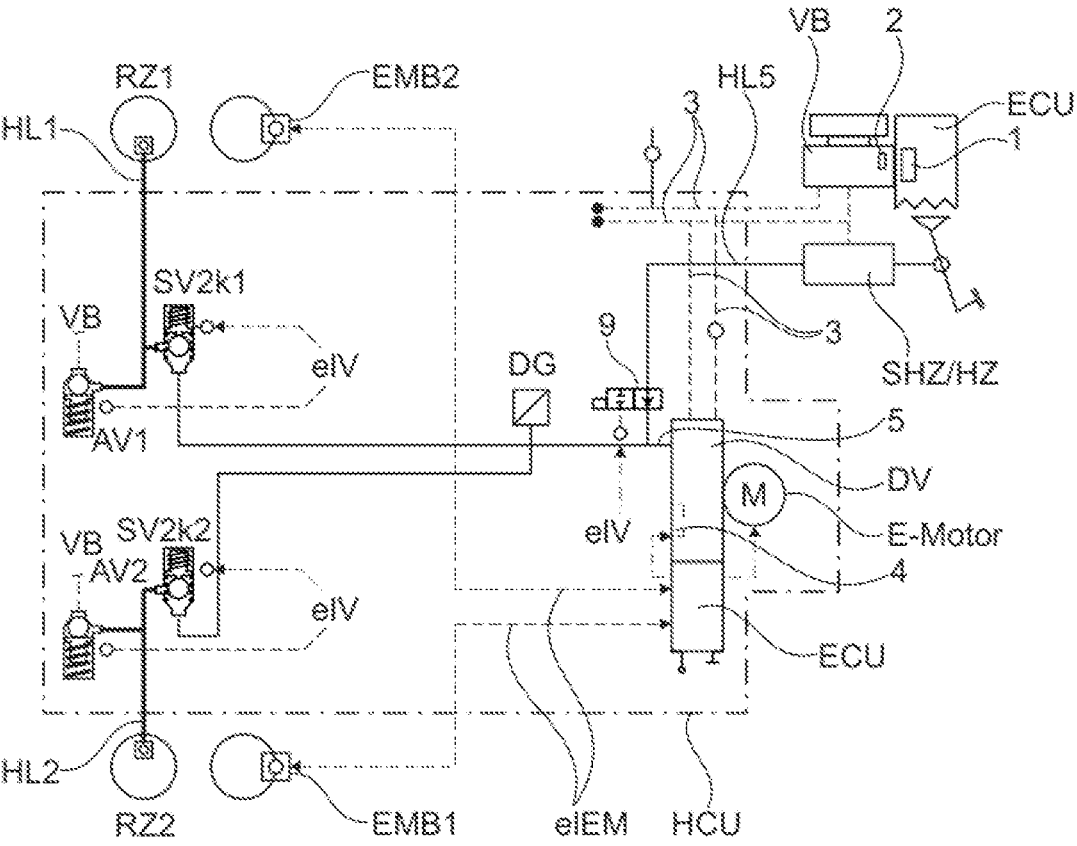

FIG. 3b shows a valve circuit similar to that shown in FIG. 1a, which enables standard ABS control as described in FIG. 1a.

FIG. 3c shows a possible embodiment with diagonal brake circuit division, in which exhaust valves AV are only used on the wheel brake cylinders on the front axle VA. In this application, the front wheel brake cylinders can be operated with the standard ABS control, as described in FIG. 1a. The pressure reduction Pab at the two rear wheel brake cylinders is only possible if the pressure is not built up at any of the front wheel brake cylinders at the same time.

As the pressure reduction is time-critical, as described in detail in FIG. 1a, the mixed operation of standard ABS control, e.g. on the front brake cylinders, and Pauf and Pab control via valve SV2k on the rear brake cylinders is associated with disadvantages in ABS control on the rear brake cylinders.

FIG. 3c shows an application in which pressure build-up Pauf and pressure reduction Pab on the rear axle is possible via the valves SV2k3 and SV2k4 through modified ABS control. The pressure gradient during pressure reduction can be adjusted by current control or current regulation of valves SV2k3 and SV2k4 because the connections of the valves make this possible. The current control or current regulation is similar to the regulation of the pressure build-up gradient as described for FIG. 1a. The compromise of the gradients during pressure reduction via the outlet valve AV described in FIG. 1a is not necessary here.

As an example for the closing of the valves SV2k1, . . . , SV2k4, this situation could occur at the valves in FIG. 3c, e.g. for the valves SV2K$_1$ in BK1 and SV2k$_2$ in BK2 during pressure reduction Pab, if the pressure reduction Pab takes place via the control of the DV, and for the valves SV2k$_3$ in BK2 and SV2k$_4$ in BK1 during opening, if the opening takes place via the control of the DV. In FIG. 3b, the closing of all SV2k valves could only occur during pressure reduction Pab via the activation of the pressure supply DV. In FIG. 3a, it could occur with all valves SV2k only during pressure build-up Pauf via control of the pressure supply DV.

Figure 3D:
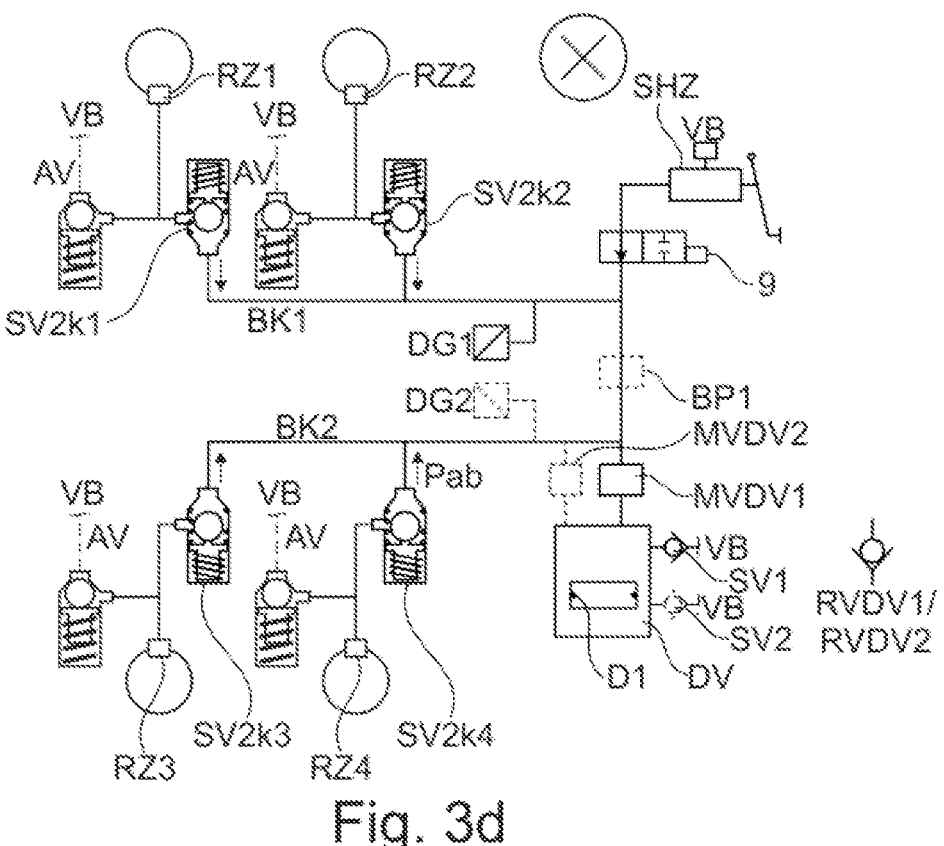

The embodiment shown in FIG. 3d corresponds to that shown in FIG. 1a and FIG. 3b, with the addition of the single master brake cylinder SHZ, the isolating valve 9, the optional circuit isolating valve BP1, the optional safety valve MVDV1 and, in the case of a dual-circuit pump, the safety valve MVDV2, and the pressure supply DV. In many systems, e.g. DE 10 2017 219 598 A1, the normally closed safety valve MVDV1/MVDV2 is used at the outlet of the pressure supply DV. The safety valves MVDV1/MVDV2 are normally closed valves and correspond in design to the outlet valve AV in FIG. 3b. This safety valve MVDV1/MVDV2 is closed if the pressure supply DV fails, e.g. if the motor of the pressure supply fails or the piston seal D1 fails during a pressure build-up, in order to prevent an uncontrolled backflow of volume from the wheel brake cylinders into the pressure supply DV and thus an unwanted and uncontrolled pressure reduction in the wheel brake cylinders. When using a pressure supply DV with a double-stroke piston, which separates two working chambers from each other in a sealing manner, two solenoid valves MVDV and MVDV2 can be used in the hydraulic connections, which connect the two outlets of the working chambers with the brake circuits BK1 and BK2, for their optional shut-off and opening. Here too, both brake circuits BK1 and BK2 can be optionally connected via a BP1 valve.

A rotary pump, such as a gear pump, can also be used instead of a piston pump, whereby a simple non-return valve RVDV1 can be provided at the outlet of the pump instead of a solenoid valve MVDV1. This non-return valve RVDV1 fulfills the same function as the solenoid valve MVDV1 if the pressure supply DV fails. In contrast to the solenoid valve MVDV1, where pressure can be reduced via the pressure supply DV via the open valve, this is not possible with the non-return valve RVDV1. The pressure reduction Pab in a system with a rotary pump therefore takes place via the outlet valves AV. With slow pressure reduction, the outlet valves AV can be controlled individually or all together via the pressure transmitter DG1 for pressure reduction Pab. The combination of rotary pump with non-return valve RVDV1 at the pump outlet is a cost-effective solution for a pressure supply DV. For some rotary pumps, it is also possible to combine a pressure supply with solenoid valve MVDV1, with the advantages of a highly controllable pressure reduction speed via the rotary pump, e.g. for gear pumps.

As shown in FIG. 1*a*, in some brake systems with two brake circuits BK1 and BK2 there is a de-energized open circuit isolating valve KTV, similar in design to isolating valve BP1 in FIG. 3*a*, which is activated and thus closed in the event of a fault, e.g. if brake circuit BK1 is leaking, so that the other brake circuit BK2 can still be pressurized by the pressure supply DV.

The optional BP1 and MVDV1 switching valves can be used in various designs:

1. Both valves are used;
2. Only the MVDV1 safety valve is used, without the BP1 circuit separation valve;
3. Only the BP1 circuit separation valve is used, without the MVDV1 safety valve.

Of all three embodiments, embodiment no. 1 is the most expensive brake system, with the advantage of high safety in the event of failure of the pressure supply DV or a brake circuit BK1 or BK2, as described above.

In embodiment no. 2, the failure of a brake circuit, e.g. leakage of the brake circuit BK1, can be determined with the aid of a diagnosis. It is thus also possible to use diagnostics to determine which wheel circuit has failed, e.g. leakage of the wheel brake cylinder RZ1, whereupon the associated valve SV2*k*1 can be closed. The other wheel brake cylinders RZ2, RZ3 and RZ4 can continue to be pressurized via the pressure supply DV.

In embodiment no. 3, i.e. without safety valve MVDV1, if the pressure supply DV fails, e.g. due to a leak in the piston seal of the pressure supply DV, the switching valve 9 can be opened and the circuit separation valve BP1 closed. The driver can then check the pressure in brake circuit BK1 using the brake pedal. Only brake circuit BK2 then fails. If the pressure supply fails during braking, the pressure in the wheel brake cylinders RZ1, . . . , RZ4 can be reduced via the valves AV with the valves SV2*k*1, . . . , SV2*k*4 closed.

Figures 4A, 4B:
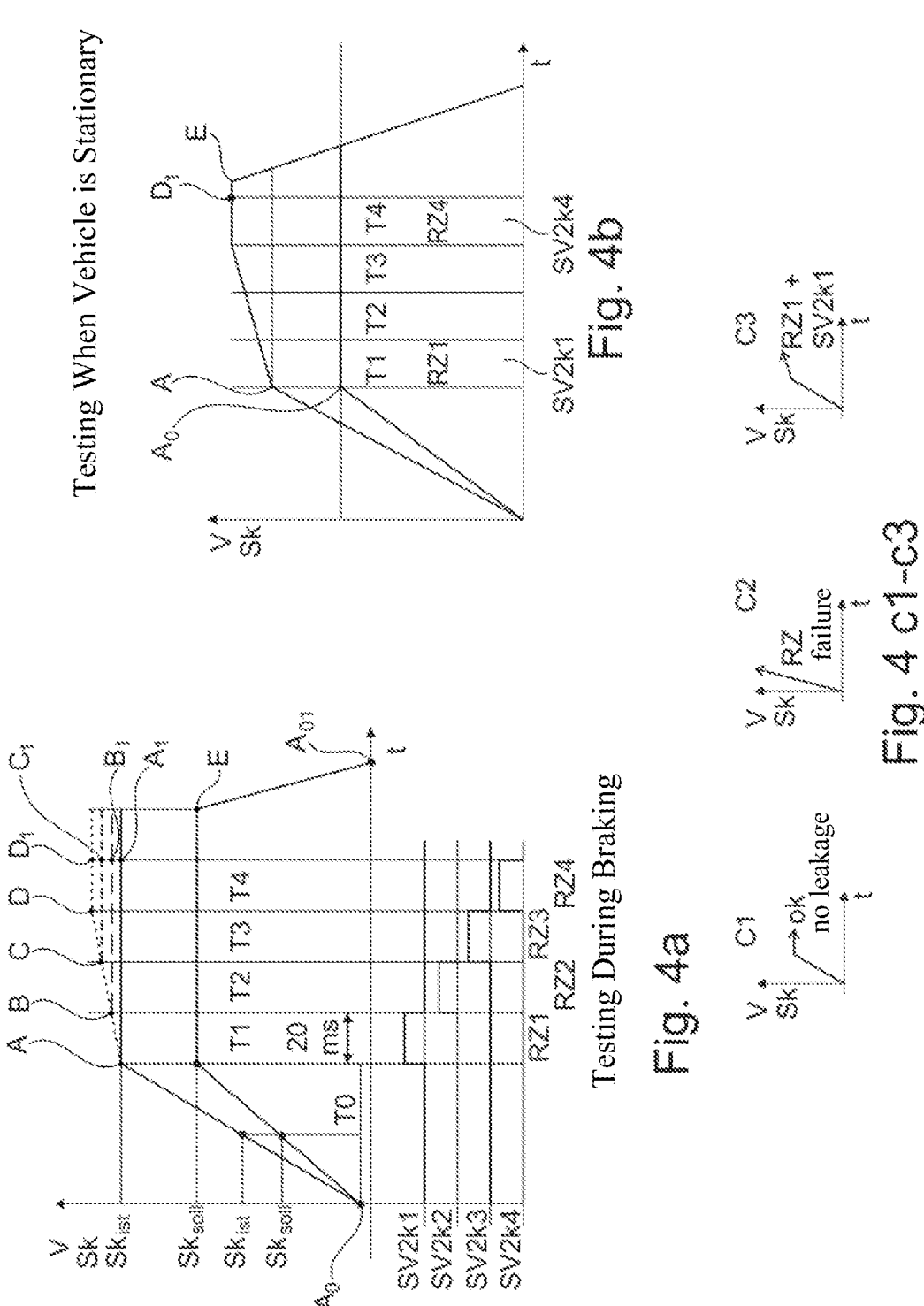

FIGS. 4*a* and 4*b* show test cycles for testing the tightness of the brake system during diagnostics. FIG. 4*a* shows tests T0-T4 during braking. At the start of braking from point A0 to point A, the pressure and the volume absorption V of the wheel brake cylinders are continuously measured in test T0 during the pressure build-up, e.g. via the piston travel Sk of the pressure supply DV. The set value of the piston travel $Sk_{soll}$ is supplied by the stored pressure-volume characteristic of the brake, PV characteristic, as a function of the pressure and is compared with the actual value of the piston travel $Sk_{ist}$. The pressure is kept constant at point A. If no difference between $Sk_{soll}$ and $Sk_{ist}$ was measured at point A, this comparison remains over the entire braking phase up to point A1 and test T0 is negative. If the test T0 is negative, then further tests (T1, T2, T3, T4) are not necessary. If a difference is measured, there is a leak in a wheel circuit, i.e. between a wheel brake cylinder RZ and the associated valve SV2*k*, and the test T0 is positive. If the test is positive, but only a very small difference between $Sk_{soll}$ and $Sk_{ist}$ was measured at point A, then further tests (T1, T2, T3, T4) are not necessary. A warning on the display should prompt the driver to visit the workshop at the first opportunity. The difference between $Sk_{soll}$ and $Sk_{ist}$ is very small if the volume in the reservoir is sufficient for many more brake applications, e.g. 1000, despite volume loss from the brake system due to the leak in the wheel circuit and the volume loss can be compensated for by volume delivery from the pressure supply DV. If the test T0 is positive and more than a very small difference between $Sk_{soll}$ and $Sk_{ist}$ was measured at point, the wheel circuit in which the leak is present must be determined. To do this, test T1 is carried out at point A by closing the valve SV2*k*1 assigned to wheel brake cylinder RZ1. If wheel circuit 1 is leaking, no piston movement Sk is required to keep the measured pressure constant after valve SV2*k*1 is closed, and test T1 is positive. If the test T1 is positive, then the valve SV2*k*1 remains closed until the end of braking A01, from point A to point A1 the piston travel Sk of the pressure supply DV remains constant, and further tests (T2, T3, T4) are not necessary. The test time of test T1, the test phase, is selected to be short, e.g. 20 ms, so that the braking process and possibly also the driver are not disturbed by the test. If, for example, the driver wants to reduce the pressure during the test phase, this is only done via the piston movement of the pressure supply DV after the test phase has been completed or immediately if a wheel circuit has already been identified as leaking. If the driver wants to increase the pressure during the test phase, the test is aborted. If the test T1 was negative, i.e. despite closing the valve SV2*k*1, an increase in the piston travel Sk of the pressure supply DV is required to keep the pressure constant, there is no leak in wheel circuit 1 but in another wheel circuit, and so after point A the leakage flow and thus the piston travel Sk of the pressure supply DV continues to act in the limit case up to test T4 of wheel circuit 4. The piston travel $Sk_{ist}$ of the pressure supply DV then increases during the test phase T1 from point A to point B, and point B is reached. After the negative test T1, the valve SV2*k*1 is opened. If test T1 is positive, no further test is carried out, valve SV2*k*1 remains closed during subsequent braking operations and the difference between $Sk_{soll}$ and $Sk_{ist}$ at point A is maintained over the entire braking phase up to point A01. A warning on the display should prompt the driver to visit the workshop immediately.

After a positive test T0 (more than a very small difference between $Sk_{soll}$ and $Sk_{ist}$ was measured at point A) and a negative test T1, test T2 is carried out for wheel circle 2 at point B. Test T2 is similar to test T1. For this purpose, test T2 is performed at point B by closing the valve SV2*k*2 assigned to wheel brake cylinder RZ2. If wheel circuit 2 is leaking, no piston movement Sk is necessary after valve SV2*k*2 is closed in order to keep the measured pressure constant, and test T2 is positive. If the test T2 is positive, the valve SV2*k*2 remains closed until the end of braking A01, from point B to point B1 the piston travel Sk of the pressure supply DV remains constant and further tests (T3, T4) are not necessary. The test time of test T2, the test phase, is selected to be short, e.g. 20 ms, so that the braking process and possibly also the driver are not disturbed by the test. If, for example, the driver wants to reduce the pressure during the test phase, this is only done via the piston movement of the pressure supply DV after the test phase has been completed or immediately if a wheel circuit has already been identified as leaking. If the driver wants to increase the pressure during the test phase, the test is aborted. If the test T2 was negative, i.e. despite closing the valve SV2*k*2, an increase in the piston travel Sk of the pressure supply DV is required to keep the pressure constant, there is no leak in wheel circuit 2 but in another wheel circuit, and so after point B the leakage flow and thus the piston travel Sk of the pressure supply DV continues to act in the limiting case up to test T4 of wheel circuit 4. The piston travel Sk of the pressure supply DV then increases during the test phase T2 from point B to point C, and point C is reached. After the negative test T2, the valve SV2*k*2 is opened. If test T2 is positive, no further test is carried out, valve SV2*k*2 remains closed during subsequent braking operations and the difference between $Sk_{soll}$ and $Sk_{ist}$ at point B is maintained throughout the entire braking phase up to point A01. A warning on the display should prompt the driver to visit the workshop immediately.

After a positive test T0 (more than a very small difference between $Sk_{soll}$ and $Sk_{ist}$ was measured at point A) and negative tests T1 and T2, test T3 is carried out for wheel circle 3 at point C. Test T3 is similar to test T1. In addition, test T3 is carried out at point C by closing the valve SV2*k*3 assigned to wheel brake cylinder RZ3. If wheel circuit 3 is leaking, no piston movement Sk is necessary after valve SV2*k*3 is closed in order to keep the measured pressure constant, and test T3 is positive. If the test T3 is positive, then the valve SV2*k*3 remains closed until the end of braking A01, from point C to point C1 the piston movement Sk of the pressure supply DV remains constant and a further test (T4) is not necessary. The test time of test T3, the test phase, is selected to be short, e.g. 20 ms, so that the braking process and possibly also the driver are not disturbed by the test. If, for example, the driver wants to reduce the pressure during the test phase, this is only done via the piston movement of the pressure supply DV after the test phase has been completed or immediately if a wheel circuit has already been identified as leaking. If the driver wants to increase the pressure during the test phase, the test is aborted. If the test T3 was negative, i.e. despite closing the valve SV2*k*3, an increase in the piston travel Sk of the pressure supply DV is required to keep the pressure constant, there is no leak in wheel circuit 3 but in another wheel circuit, and so after point C the leakage flow and thus the piston travel Sk of the pressure supply DV continues to act in the limiting case up to test T4 of wheel circuit 4. The piston travel Sk of the pressure supply DV then increases during the test phase T3 from point C to point D, and point D is reached. After the negative test T3, the valve SV2*k*3 is opened. If test T3 is positive, no further test is carried out, valve SV2*k*3 remains closed during subsequent braking operations and the difference between $Sk_{soll}$ and $Sk_{ist}$ at point C is maintained throughout the braking phase up to point A01. A warning on the display should prompt the driver to visit the workshop immediately.

After a positive test T0 (more than a very small difference between $Sk_{soll}$ and $Sk_{ist}$ was measured at point A) and negative tests T1, T2 and T3, it can be concluded that wheel circuit 4 is leaking and valve SV2*k*4 can be closed immediately. On the other hand, test T4 for wheel circuit 4 can also be carried out at point D in order to rule out leaks elsewhere in the brake system. Test T4 runs in a similar way to test T1. For this purpose, test T4 is carried out at point D by closing the valve SV2*k*4 assigned to wheel brake cylinder RZ4. If the wheel circuit 4 is leaking, no piston movement Sk is necessary after closing the valve SV2*k*4 to keep the measured pressure constant, the test T4 is positive and point D1 is reached. If the test T4 is positive, then the valve SV2*k*4 remains closed until the end of braking A01, from point D to point D1 the piston movement Sk of the pressure supply DV remains constant and no further test is necessary. The test time of test T4, the test phase, is selected to be short, e.g. 20 ms, so that the braking process and possibly also the driver are not disturbed by the test. If, for example, the driver wants to reduce the pressure during the test phase, this is only done via the piston movement of the DV pressure supply after the test phase has been completed or immediately if a wheel circuit has already been identified as leaking. If the driver wants to increase the pressure during the test phase, the test is aborted. If the test T4 was negative, i.e. despite closing the valve SV2*k*4, an increase in the piston travel Sk of the pressure supply DV is required to keep the pressure constant, there is leak at another point in the brake system, and so after point D the leakage flow and thus the piston travel Sk of the pressure supply DV continues. The piston travel Sk of the pressure supply DV then increases during the test phase T4 from point D to the end of braking A01 (not shown). After the negative test T4, the valve SV2*k*4 is opened. If test T4 is positive, valve SV2*k*4 remains closed during subsequent braking operations and the difference between $Sk_{soll}$ and $Sk_{ist}$ at point D is maintained over the entire braking phase up to point A01. The test cycle is completed when test T4 is performed. For both the positive (leak in wheel circuit 4) and negative (leak elsewhere in the brake system) tests T4, a warning should appear on the display to prompt the driver to visit the workshop immediately.

With T4, the test cycle is completed at point D1 and the braking process with pressure reduction is completed at point E. This diagnosis requires appropriate accuracy and dynamics of the sensors, e.g. piston travel, pressure.

FIG. 4*b* shows the test cycle when the vehicle is stationary, which corresponds almost fully to 4*a* with the small difference that the pressure is determined by the DP and not by the driver. To simplify matters, the leak in RZ4 is only determined in test 4. The test time of e.g. 20 ms can also be increased here, e.g. by a factor of 2.

Another situation arises if, in addition to a leak in the wheel circuit, which is not very small, the associated valve SV2*k* also has a leak, e.g. due to dirt particles between the valve armature and valve seat. If this is the case with wheel circuit 1 and valve SV2*k*1, for example, then the piston travel Sk does not remain constant during test T1 in order to keep the pressure constant. Volume losses due to leaks in valve SV2*k* are small and can be compensated by the pressure supply, so that wheel circuit 1 fails, but the other wheel circuits do not fail. A warning on the display should prompt the driver to visit the workshop immediately.

FIGS. 4*c*1 to 4*c*3 show the basic test sequences.

FIG. 4*c*1 shows the piston travel Sk of the DV piston when there is no leakage. The tests T0, . . . , T4 are then not required.

FIG. 4*c*2 shows the piston travel Sk of the DV piston if, for example, wheel brake cylinder RZ1 is leaking, without activation of the associated valve SV2*k*1, possibly with a high leakage volume flow, $QSV2k_{1,Leck}$, which is not throttled by the associated closed SV2*k*

FIG. 4*c*3 shows the piston travel Sk of the DV piston when, for example, wheel brake cylinder RZ1 is leaking, whereby the leakage volume flow, $QSV2k1_{,Leck}$, is small due to the closing of the leaking valve SV2*k*1. A similar piston travel Sk as in FIG. 4*c*3 occurs if a conventional inlet valve EV1 with parallel non-return valve RV1 is used instead of valve SV2*k*1, whereby either the inlet valve EV1 or the non-return valve RV1 is leaking or if both are leaking. By activating the e.g. leaking inlet valve EV1, the leak volume flow $QEV1_{,leck}$ through the leaking wheel brake cylinder RZ1 is not reduced to 0 cm³/s but to a small value, e.g. in the worst case EV1 and RV1 are both leaking, and the leak flow e.g. $QEV1_{,leak}=20$ cm³/s at 50 bar pressure difference via the valve EV1.

If the difference between $Sk_{soll}$ and $Sk_{ist}$ is very small during the test T0 at time A0, braking can be maintained as in the normal case. However, if the difference is not very small, the failure of a wheel circuit, e.g. due to leakage of a wheel brake cylinder seal and closure of the associated valve SV2*k*, means that the vehicle deceleration is less than in the normal case and a yaw moment is generated on the vehicle during braking. The electronic stability program ESP is generally able (except in the case of emergency braking) to adjust the vehicle deceleration to the vehicle deceleration under normal conditions. This means that the driver's braking sensation remains largely normal and startle reactions by the driver are avoided. Furthermore, the electronic stability program ESP is able to partially compensate for the yaw moment, so that startle reactions by the driver can also be reduced.

Figure 4D:
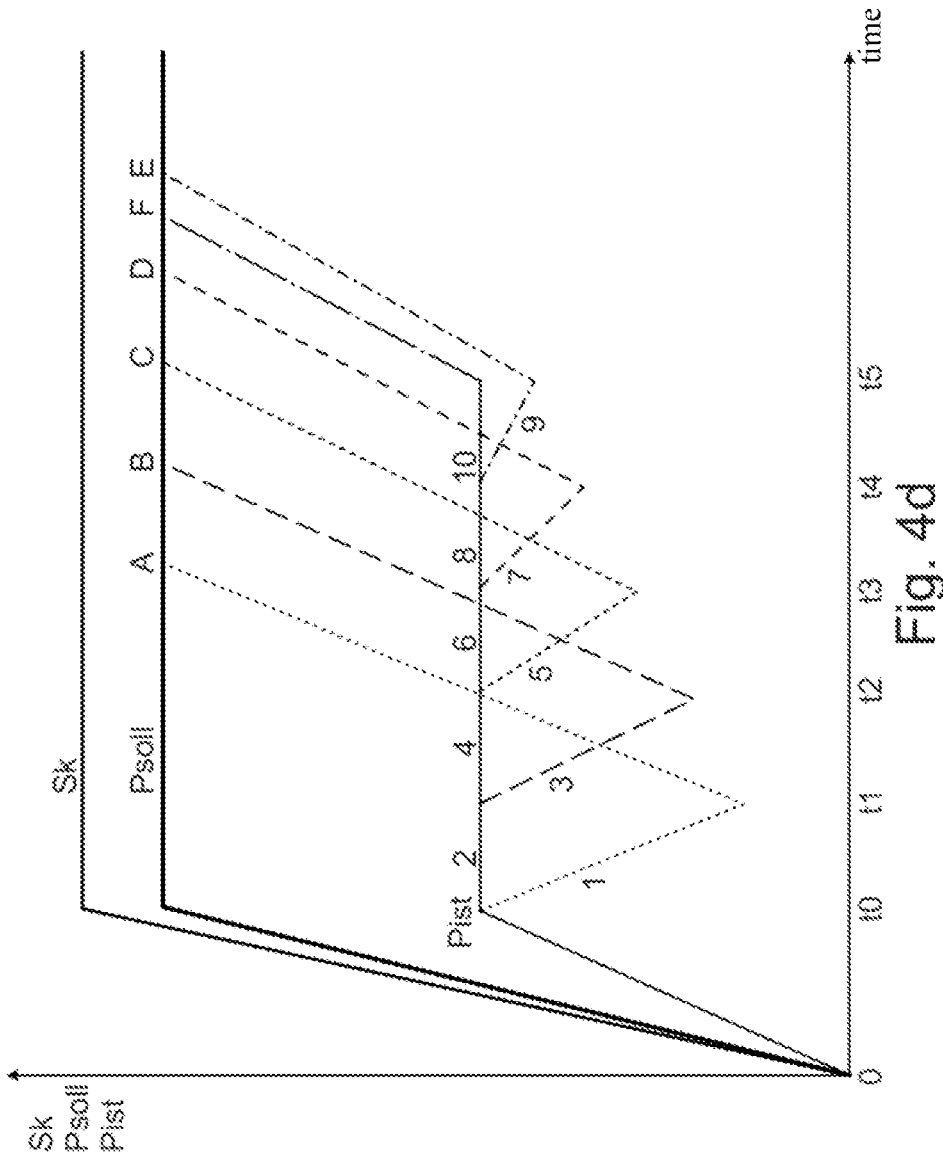

FIG. 4d shows an example of a first alternative diagnostic sequence for checking for individual faults with the piston travel curve Sk of the pressure supply DV, which increases from time 0 to time t0 and remains constant from time t0, and the target pressure curve, Psoll, which is derived from the piston travel curve Sk with the aid of the PV curve (pressure-volume curve) of the brake system. FIG. 4d also shows the actual pressure curve, Pist, which is measured with the pressure sensor DG (see FIG. 3a). At time t0, a difference is detected between the target pressure, Psoll, and the actual pressure, Pist, which indicates a malfunction of the brake system. For this reason, all valves SV2k1, . . . , SV2k4 are closed at time t0 and the actual pressure curve Pist is observed during the test period from time t0 to time t1. If the actual pressure Pist drops from time t0 to time t1, which is indicated by the dashed line 1, then the malfunction of the brake system is not caused by a leak in a wheel circuit, RK1, . . . , RK4, but, for example, by a leak in the piston seal of the pressure supply DV. The valves SV2k1, SV2k2, SV2k3 and SV2k4 can be opened again and the actual pressure Pist can be raised to the target pressure Psoll, which is reached at point A, via a piston movement of the pressure supply DV. Due to the leakage of the piston seal of the pressure supply DV, a constant piston movement is also required after point A in order to maintain the actual pressure Pist at the target pressure level Psoll. This has the advantage that the normal braking effect is maintained in all wheel brake cylinders despite the fault. However, if the leakage rate of the piston seal exceeds the maximum delivery rate of the pressure supply DV at the target pressure level Psoll, the system switches to a fallback level without pressure supply DV.

If the actual pressure Pist does not drop in the test period t0 to t1, which is indicated by the solid line 2 at the actual pressure Pist from time t0 to t1, valve SV2k1 is opened at time t1 and the actual pressure curve Pist is observed in the test period from time t1 to time t2. If the actual pressure Pist drops from time t1 to time t2, which is indicated by the dashed line 3, then the malfunction of the brake system is caused by a leak in wheel circuit 1. Valve SV2k1 is then closed at time t2, while valves SV2k2, SV2k3 and SV2k4 are opened again, and the actual pressure Pist can be raised to the target pressure Psoll, which is reached at point B, via a piston movement of the pressure supply DV.

If the actual pressure Pist does not drop in the test period t1 to t2, which is indicated by the solid line 4 at the actual pressure Pist from time t1 to time t2, valve SV2k2 is opened at time t2 and the actual pressure curve Pist is observed in the test period from time t2 to time t3. If the actual pressure Pist drops from time t2 to time t3, which is indicated by the dashed line 5, then the malfunction of the brake system is caused by a leak in the wheel circuit 2. Valve SV2k2 is then closed at time t3, while valves SV2k1, SV2k3 and SV2k4 are opened again, and the actual pressure Pist can be raised to the target pressure Psoll, which is reached at point C, via a piston movement of the pressure supply DV.

If the actual pressure Pist does not drop in the test period from time t2 to time t3, which is indicated by the solid line 6 at the actual pressure Pist from time t2 to t3, valve SV2k3 is opened at time t3 and the actual pressure curve Pist is observed in the test period from time t3 to time t4. If the actual pressure Pist drops from time t3 to time t4, which is indicated by the dotted line 7, then the malfunction of the brake system is caused by a leak in the wheel circuit 3. Valve SV2k3 is then closed at time t4, while valves SV2k1, SV2k2 and SV2k4 are opened again, and the actual pressure Pist can be raised to the target pressure Psoll, which is reached at point D, via a piston movement of the pressure supply DV.

If the actual pressure Pist does not drop in the test period from time t3 to time t4, which is indicated by the solid line 8 at the actual pressure Pist from time t3 to t4, valve SV2k4 is opened at time t4 and the actual pressure curve Pist is observed in the test period from time t4 to time t5. If the actual pressure Pist drops from time t4 to time t5, which is indicated by the dotted line 9, then the malfunction of the brake system is caused by a leak in the wheel circuit 4. Valve SV2k4 is then closed at time t5, while valves SV2k1, SV2k2 and SV2k3 are opened again, and the actual pressure Pist can be raised to the target pressure Psoll, which is reached at point E, via a piston movement of the pressure supply DV.

If the actual pressure Pist does not drop during the test period from time t4 to time t5, which is indicated by the solid line 10 at the actual pressure Pist from time t4 to t5, the malfunction of the brake system is not caused by a leak in a wheel circuit, RK1, . . . , RK4, but by air bubbles in the brake fluid, for example. At time t5, the valves SV2k1, SV2k2, SV2k3 and SV2k4 can be opened again, and the actual pressure Pist can be raised to the target pressure Psoll, which is reached at point F, via a piston movement of the pressure supply DV.

The sequence in which the valves are opened and the size of the leaks in the wheel circuits, RK1, . . . , RK4, and piston seal of the pressure supply DV is selected here as an example and is not binding. The sequence can be selected according to driving dynamics aspects, for example. As in the event of a leak in the piston seal of the pressure supply DV, the associated valve SV2k1 can remain open in the event of a leak in a wheel circuit, e.g. wheel circuit 1, in order to maintain the actual pressure Pist at the target pressure level Psoll with a continuous piston movement. As already mentioned, this has the advantage that the normal braking effect is maintained in all wheel brake cylinders despite the fault. In this case, too, if the leakage rate of the wheel circuit 1 exceeds the maximum delivery rate of the pressure supply DV at the target pressure level Psoll, the target pressure Psoll is not reached and the actual pressure Pist would remain lower than the target pressure Psoll. In this case, valve SV2k1 is closed. If brake fluid flows out of the brake system when valve SV2k1 is open, this is indicated by a reduction in the level in reservoir VB, so that the compensation of the leakage flow can be limited in time and valve SV2k1 can be closed in good time so that sufficient brake fluid remains in reservoir VB for subsequent braking operations. When brake fluid flows out of the brake system, the risk that the environment may be contaminated with brake fluid and that fire may occur if the highly flammable brake fluid comes into contact with hot parts, such as the brake disk, must be taken into account. This risk can be reduced by not opening the SV2k1 valve.

Figure 4E:
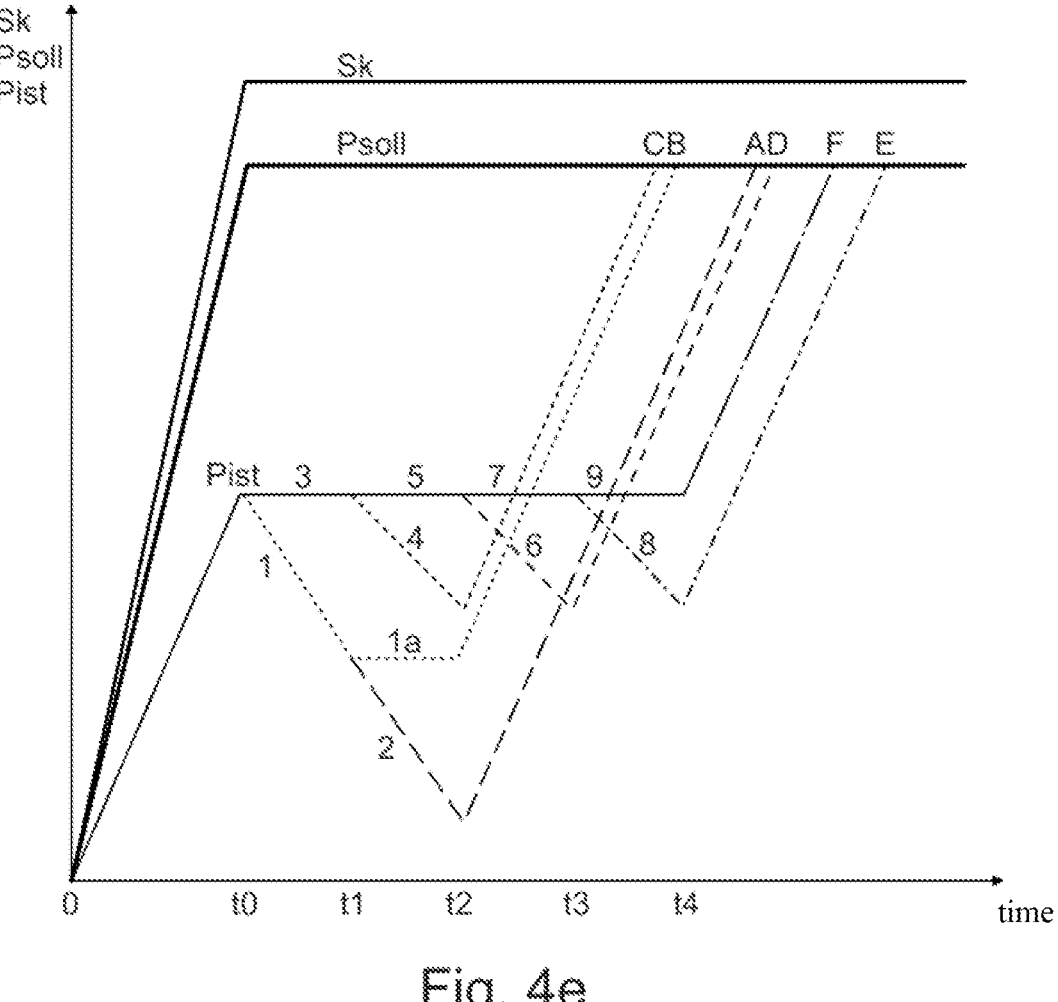
Figure 4F:
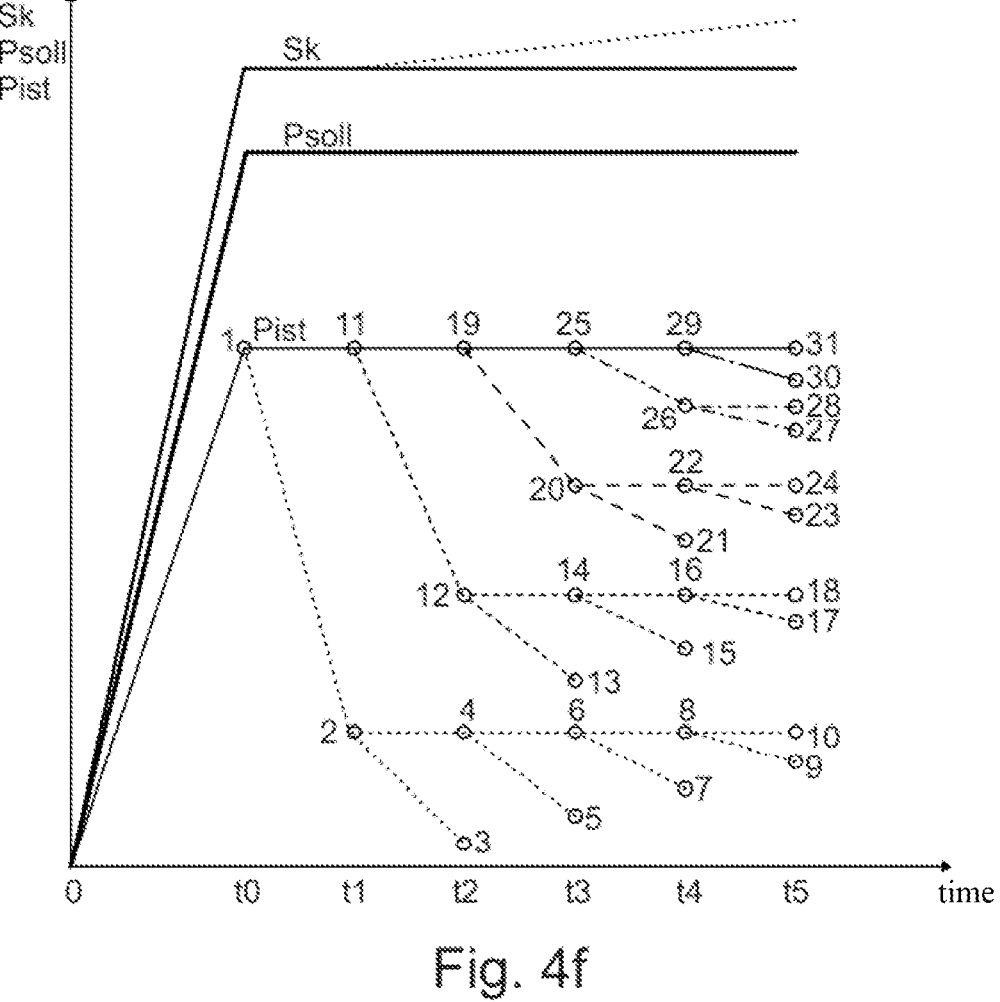

FIG. 4e shows an example of a second alternative diagnostic sequence for checking for individual faults with the piston travel curve Sk of the pressure supply DV, which increases from time 0 to time t0 and remains constant from time t0, and the target pressure curve, Psoll, which is derived from the piston travel curve Sk with the aid of the PV curve (pressure-volume curve) of the brake system. FIG. 4*e* also shows the pressure curve, Pist, which is measured with the pressure sensor DG (see FIG. 3*a*). At time t0, a difference is detected between the target pressure, Psoll, and the actual pressure, Pist, which indicates a malfunction of the brake system. For this reason, valve BP1 (see FIG. 3*a*) is closed at time t0 and the actual pressure curve Pist in brake circuit BK2 (see FIG. 3*a*) is observed during the test period from time t1 to time t2. Valves SV2*k*3 and SV2*k*4 remain open. Valves SV2*k*1 and SV2*k*2 are closed to prevent brake fluid from flowing out of both wheel circuits RK1 and RK2 in the event of a leak in brake circuit 1, RK1 or RK2, during the test period from time t1 to time t2.

For the further course of the diagnosis, a distinction is now made as to whether the pressure Pist drops in the time interval from time t0 to time t1 or not.

1. If the actual pressure in brake circuit 2, measured with the pressure sensor DG, drops from time t0 to time t1, which is indicated by the fine dashed line 1, then the malfunction of the brake system is caused by a leak in a wheel circuit in brake circuit BK2, RK3 or RK4. For this reason, the valve SV2*k*3 is closed at time t1 and the actual pressure curve Pist in brake circuit BK2 is observed during the test period from time t1 to time t2.

If the actual pressure Pist drops from time t1 to time t2, which is indicated by the rough dashed line 2, then the malfunction of the brake system is caused by a leak in the wheel circuit 4. The valve SV2*k*4 is then closed at time t2 and the valve BP1 and the valves SV2*k*1, SV2*k*2 and SVk3 are opened. The actual pressure Pist in the wheel brake cylinders RZ1, RZ2 and RZ3 can be raised to the target pressure Psoll, which is reached at point A, from time t2 via a piston movement of the pressure supply DV.

If the actual pressure Pist does not drop from time t1 to time t2, which is indicated by the fine dashed line 1*a* at the actual pressure from time t1 to t2, the wheel circuit 3 is leaking and valve BP1 and valves SV2*k*1 and SV2*k*2 are opened at time t2. The actual pressure Pist in the wheel brake cylinders RZ1, RZ2 and RZ4 can be raised to the target pressure, which is reached at point B, from time t2 via a piston movement of the pressure supply DV.

2. If the actual pressure Pist in brake circuit 2, measured with the pressure sensor DG (see FIG. 3*a*), does not drop from time t0 to time t1, which is indicated by the solid line 3, then the malfunction of the brake system is not caused by a leak in a wheel circuit in brake circuit BK2, RK3 or RK4. For this reason, valve BP1 is opened at time t1 and the actual pressure curve Pist in brake circuit BK2 is observed in the test period t1 to t2. If the actual pressure Pist drops from time t1 to time t2, which is indicated by the slightly less finely dashed line 4, then the malfunction of the brake system is not caused by a leak in wheel circuit 1 or wheel circuit 2, because valves SV2*k*1 and SV2*k*2 are still closed, but by a leak in the pressure supply DV, for example. In this case, the valves SV2*k*1 and SV2*k*2 are opened at time t2, whereby the valves SV2*k*3 and SV2*k*4 are still open and the actual pressure Pist in all wheel brake cylinders RZ1, RZ2, RZ3 and RZ4 can be raised to the target pressure Psoll, which is reached at point C, via a piston movement of the pressure supply DV from time t2. Due to the leakage of the piston seal of the pressure supply DV, constant piston movement is also required after point C in order to maintain the actual pressure Pist at the target pressure level Psoll. As already mentioned, this has the advantage that the normal braking effect is maintained in all wheel brake cylinders despite the fault. However, if the leakage rate of the piston seal exceeds the maximum delivery rate of the pressure supply DV at the target pressure level Psoll, the system switches to a fallback level without pressure supply DV.

If the actual pressure Pist does not drop from time t1 to time t2, which is indicated by the solid line 5 at the actual pressure Pist from time t1 to time t2, wheel circuit 1 or wheel circuit 2 is leaking. For this reason, the valve SV2*k*1 is opened at time t2 and the actual pressure curve Pist is observed during the test period from time t2 to time t3.

If the actual pressure Pist drops from time t2 to time t3, which is indicated by the slightly less finely dashed line 6, then the malfunction of the brake system is caused by a leak in wheel circuit 1. At time t3, valve SV2*k*1 is then closed and valve SV2*k*2 is opened, whereby valves SV2*k*3 and SV2*k*4 are still open and the actual pressure Pist in the wheel brake cylinders RZ2, RZ3 and RZ4 can be raised to the target pressure Psoll, which is reached at point D, via a piston movement of the pressure supply DV from time t3.

If the actual pressure Pist does not drop from time t2 to time t3, which is indicated by the solid line 7, then the malfunction of the brake system is not caused by a leak in the wheel circuit 1. For this reason, the valve SV2*k*2 is opened at time t3 and the actual pressure curve Pist is observed during the test period from time t3 to time t4.

If the actual pressure Pist drops from time t3 to time t4, which is indicated by the dotted line 8, then the malfunction of the brake system is caused by a leak in wheel circuit 2. At time t4, valve SV2*k*2 is then closed while valves SV2*k*1, SV2*k*3 and SV2*k*4 are still open, and the actual pressure Pist in the wheel brake cylinders RZ1, RZ3 and RZ4 can be raised to the target pressure Psoll, which is reached at point E, via a piston movement of the pressure supply DV from time t4.

If the actual pressure Pist does not drop from time t3 to time t4, which is indicated by the solid line 9 at the actual pressure Pist from time t3 to t4, the malfunction of the brake system is not caused by a leak in a wheel circuit, RK1, . . . , RK4, but by air bubbles in the brake fluid, for example. At time t4, with valves SV2*k*1, SV2*k*2, SV2*k*3, SV2*k*4 open, the actual pressure Pist can be raised to the target pressure Psoll, which is reached at point F, via a piston movement of the pressure supply DV.

The sequence in which the valves are opened and closed and the size of the leaks in the wheel brake circuits and piston seal of the pressure supply DV are selected here as examples and are not binding. The sequence can be selected according to driving dynamics aspects, for example. As in the event of a leak in the piston seal of the pressure supply DV, the associated valve SV2*k*1 can remain open if a wheel brake circuit, e.g. wheel brake circuit 1, is leaking in order to maintain the actual pressure Pist at the target pressure level Psoll with a continuous piston movement. As already mentioned, this has the advantage that the normal braking effect is maintained in all wheel brake cylinders despite the fault. In this case, too, if the leakage rate of the wheel circuit 1 exceeds the maximum delivery rate of the pressure supply DV at the target pressure level Psoll, the target pressure Psoll is not reached and the actual pressure Pist would remain lower than the target pressure Psoll. In this case, valve SV2$k$1 is closed. If brake fluid flows out of the brake system when valve SV2$k$1 is open, this is indicated by a reduction in the level in reservoir VB, so that the compensation of the leakage flow can be limited in time and valve SV2$k$1 can be closed in good time so that sufficient brake fluid remains in reservoir VB for subsequent braking operations. When brake fluid flows out of the brake system, the risk that the environment may be contaminated with brake fluid and that fire may occur if the highly flammable brake fluid comes into contact with hot parts, such as the brake disk, must be taken into account. This risk can be reduced by not opening the SV2$k$1 valve.

FIG. 4$f$ shows an example of the first alternative diagnostic sequence, but now for checking for double faults in the form of a logic tree, with the piston travel curve Sk of the pressure supply DV, which increases from time 0 to time t0 and remains constant from time t0, and the target pressure curve, Psoll, which is derived from the piston travel curve Sk with the aid of the PV characteristic curve (pressure-volume characteristic curve) of the brake system. FIG. 4$f$ also shows the actual pressure curve, Pist, which is measured with the pressure sensor DG (see FIG. 3$a$). At time t0, a difference between the target pressure, Psoll, and the actual pressure, Pist, is detected at point 1, which indicates a malfunction of the brake system. For this reason, all valves SV2$k$1, . . . , SV2$k$4 are closed at time t0 and the actual pressure curve Pist is observed during the test period from time t0 to time t1. If the actual pressure Pist drops from time t0 to time t1 to point 2, then the malfunction of the brake system is caused by at least one leak other than any leaks in the wheel circuits, RK1, . . . , RK4, e.g. due to a leak in the piston seal of the pressure supply DV. To additionally check the tightness of the wheel circuits, RK1, . . . , RK4, the delivery rate of the pressure supply DV is set in point 2 so that the leakage flow is compensated for by the leakage of the piston seal of the pressure supply DV. This is shown by the fine dashed line at piston travel Sk from time t1. However, if the leakage flow is greater than the maximum flow rate of the pressure supply DV, the diagnosis is aborted and switched to a fallback level without pressure supply.

Otherwise, valve SV2$k$1 is opened at the same time in point 2. If the measured pressure drops, point 3 is reached at time t2, which indicates the double fault "Pressure supply DV and wheel circuit 1 leaking". If the measured pressure does not drop, point 4 is reached at time t2. At point 4, valve SV2$k$1 is closed and valve SV2$k$2 is opened. If the measured pressure drops, point 5 is reached at time t3, which indicates the double fault "Pressure supply DV leaking and wheel circuit 2 leaking". If the measured pressure does not drop, point 6 is reached at time t3. At point 6, valve SV2$k$2 is closed and valve SV2$k$3 is opened. If the measured pressure drops, point 7 is reached at time t4, which indicates the double fault "Pressure supply DV leaking and wheel circuit 3 leaking". If the measured pressure does not drop, point 8 is reached at time t4. Valve SV2$k$4 is opened at point 8. If the measured pressure drops, point 9 is reached at time t5, which indicates the double fault "Pressure supply DV leaking and wheel circuit 4 leaking". If the measured pressure does not drop, point 10 is reached at time t5, at which only the pressure supply DV is leaking and there is no double fault because no wheel circuit, RK1, . . . , RK4, is leaking. Due to the leak in the piston seal of the pressure supply DV, a constant piston movement is required according to point 10 in order to keep the actual pressure Pist at the target pressure level Psoll. Even if there is an additional leak in a wheel circuit at point 3 or 5 or 7 or 9, e.g. wheel circuit 1 at point 3, the associated valve SV2$k$1 can remain open in order to maintain the actual pressure Pist at the target pressure level Psoll with a constant piston movement of the pressure supply DV. As already mentioned, this has the advantage that the normal braking effect is maintained in all wheel brake cylinders despite the fault. In this case, too, if the sum of the leakage rates of the piston seal and the wheel circuit 1 exceeds the maximum delivery rate of the pressure supply DV at the target pressure level, the target pressure Psoll is not reached and the actual pressure Pist remains lower than the target pressure Psoll. In this case, valve SV2$k$1 is closed. If brake fluid flows out of the brake system when valve SV2$k$1 is open, this is indicated by a reduction in the level in the reservoir, so that the compensation of the leakage flow in wheel brake cylinder RZ1 can be limited in time and valve SV2$k$1 can be closed in good time so that sufficient brake fluid remains in reservoir VB for subsequent braking operations. When brake fluid flows out of the brake system, it should also be taken into account that the environment can be contaminated with brake fluid and that fire can occur if the highly flammable brake fluid comes into contact with hot parts, such as the hot brake disk. This risk can be reduced by not opening the SV2$k$1 valve.

If the actual pressure Pist does not drop from time t0, from point 1, to time t1, then point 11 is reached at time t1 and it is checked whether the malfunction is caused by a leak in one or two wheel circuits, RK1, RK2, RK3 or RK4. To check the tightness of wheel circuit 1, valve SV2$k$1 is opened at point 11. If the measured pressure then drops, there is a leak in wheel circuit 1 and it is reached at time t2, point 12. From time t2, point 12, the system then checks for a second fault, whereby valve SV2$k$1 is closed and valve SV2$k$2 is opened at time t2. If the measured pressure then drops, point 13 is reached at time t3, which indicates the double fault "wheel circuit 1 leaking and wheel circuit 2 leaking". If the measured pressure then does not drop, point 14 is reached at time t3. This indicates that there is no leak in wheel circuit 2. At time t3, at point 14, valve SV2$k$2 is then closed and valve SV2$k$3 is opened. If the measured pressure drops as a result, point 15 is reached at time t4, which indicates the double fault "wheel circuit 1 leaking and wheel circuit 3 leaking". If the measured pressure does not drop as a result, point 16 is reached at time t4. This indicates that there is no leak in wheel circuit 3. At point 16, valve SV2$k$3 is closed and valve SV2$k$4 is opened. If the measured pressure drops as a result, point 17 is reached at time t5, which indicates the double fault "wheel circuit 1 leaking and wheel circuit 4 leaking". If the measured pressure does not drop as a result, point 18 is reached at time t5, at which only wheel circuit 1 is leaking and there is no double fault.

If the actual pressure Pist does not drop from time t1, from point 11, to time t2, then point 19 is reached at time t2 and the malfunction of the brake system is not caused by a leak in wheel circuit 1, and it is checked whether the malfunction is caused by a leak in one or two wheel circuits, RK2, RK3 or RK4.

To test the tightness of wheel circuit 2, valve SV2$k$1 is closed in point 19 and valve SV2$k$2 is opened. If the measured pressure then drops, there is a leak in wheel circuit 2 and it is reached at time t3, point 20. From time t3, point 20, the system then checks for a second fault, whereby valve SV2$k$2 is closed and valve SV2$k$3 is opened at time t3. If the measured pressure then drops, point 21 is reached at time t4, which indicates the double fault "wheel circuit 2 leaking and wheel circuit 3 leaking". If the measured pressure does not drop afterwards, point 22 is reached at time t4. This indicates that there is no leak in wheel circuit 3. At time t4, at point 22, valve SV2*k*3 is then closed and valve SV2*k*4 is opened. If the measured pressure drops as a result, point 23 is reached at time t5, which indicates the double fault "wheel circuit 2 and wheel circuit 4 leaking". If the measured pressure does not drop as a result, point 24 is reached at time t5. This indicates that there is no leak in wheel circuit 4 and that only wheel circuit 2 is leaking and there is no double fault.

If the actual pressure Pist does not drop from time t2, from point 19, to time t3, then point 25 is reached at time t3 and the malfunction of the brake system is not caused by a leak in the wheel circuits, RK1 or RK2, and it is checked whether the malfunction is caused by a leak in one or two wheel circuits, RK3 or RK4. To test the tightness of wheel circuit 3, valve SV2*k*2 is closed at point 25 and valve SV2*k*3 is opened. If the measured pressure then drops, there is a leak in wheel circuit 3 and point 26 is reached at time t4. From time t4, point 26, the system then checks for a second fault, whereby valve SV2*k*3 is closed and valve SV2*k*4 is opened at time t4. If the measured pressure then drops, point 27 is reached at time t4, which indicates the double fault "wheel circuit 3 leaking and wheel circuit 4 leaking". If the measured pressure then does not drop, point 28 is reached at time t5. This indicates that there is no leak in wheel circuit 4 and that only wheel circuit 3 is leaking and there is no double fault.

If the actual pressure Pist does not drop from time t3, from point 25, to time t4, then point 29 is reached at time t4 and the malfunction of the brake system is not caused by a leak in the wheel circuits RK1, RK2 or RK3, and it is checked whether the malfunction is caused by a leak in wheel circuit 4. To test the tightness of wheel circuit 4, valve SV2*k*3 is closed and valve SV2*k*4 is opened at point 29. If the measured pressure then drops, there is a leak in wheel circuit 4 and point 30 is reached at time t5. However, there is no double fault. If the measured pressure does not drop afterwards, point 31 is reached at time t5. This indicates that there is no leak in wheel circuit 4. If point 31 is reached, there are no leaks in the wheel circuits RK1, . . . , RK4 and the malfunction of the brake system must have another cause, e.g. air bubbles in the brake fluid.

The sequence in which the valves are opened and the size of the leaks in the wheel circuits, RK1, . . . , RK4, and piston seal of the pressure supply DV is selected here as an example and is not binding. The sequence can be selected, for example, according to driving dynamics aspects such as braking distance and driving stability. As described above, in the event of a double fault "DV leaking and wheel circuit 1 leaking", the associated valve SV2*k*1 can remain open in order to maintain the actual pressure Pist at the target pressure level Psoll with a constant piston movement of the pressure supply DV, so both valves SV2*k*1 and SV2*k*2 can also remain open in the event of a double fault, e.g. "wheel brake cylinder RZ1 leaking and wheel brake cylinder RZ2 leaking", in order to maintain the actual pressure Pist at the target pressure level Psoll with a constant piston movement of the pressure supply DV. As already mentioned, this has the advantage that the normal braking effect is maintained in all wheel brake cylinders despite the fault. In this case, too, if the sum of the two leakage rates of both wheel circuits, RK1 and RK2, exceeds the maximum delivery rate of the pressure supply DV at the target pressure level, the target pressure Psoll is not reached and the actual pressure Pist remains lower than the target pressure Psoll. If the individual leakage rates of both wheel circuits, e.g. RK1 and RK2, are already greater than the maximum flow rate of the pressure supply DV, then both valves SV2*k*1 and SV2*k*2 are closed. If the leakage rate at only one wheel circuit, e.g. RK1, exceeds the maximum flow rate of the pressure supply DV, then only valve SV2*k*1 is closed. If only the sum of the leakage rates of the two wheel circuits, e.g. RK1 and RK2, exceeds the maximum flow rate of the pressure supply DV, then a decision can be made as to which valve SV2*k*1 or SV2*k*2 is closed based on driving dynamics aspects such as braking distance and driving stability. The same applies here, i.e. if, for example, valve SV2*k*1 remains open despite a leak in wheel circuit 1, then if brake fluid flows out of the brake system, this is noticeable by a reduction in the level in reservoir VB, so that the compensation of the leakage flow can be limited in time and valve SV2*k*1 can be closed in good time so that sufficient brake fluid remains in reservoir VB for subsequent braking operations. When brake fluid flows out of the brake system, the risk that the environment may be contaminated with brake fluid and that fire may occur if the highly flammable brake fluid comes into contact with hot parts, such as the brake disk, must be taken into account. This risk can be reduced by not opening the SV2*k*1 valve.

In an intact brake system, each brake pedal travel has a defined pressure, the target pressure, in the master brake cylinder SHZ/HZ, see FIG. 1, which determines the pedal characteristics. The pressure in the master brake cylinder is measured, e.g. directly with a DG-SHZ pressure sensor, the actual pressure, or indirectly with a force-displacement sensor (not shown) which can measure the pedal force, for example. The brake pedal travel is measured via a pedal travel sensor—not shown. This allows a target pressure in the master brake cylinder to be determined for each brake pedal travel. If the master brake cylinder SHZ/HZ or valve 9 (see FIG. 1) is leaking, the volume in the master brake cylinder changes, causing the actual pressure in the master brake cylinder SHZ/HZ to deviate from the sol-pressure value.

The fault is detected by permanently comparing the actual pressure with the target pressure in the master brake cylinder SHZ/HZ. At the fallback level, if the difference between the actual pressure and the target pressure exceeds a selectable limit value, valves SV2*k*1, . . . , SV2*k*4, are closed and valve 9 is opened. The volume change in the master brake cylinder SHZ/HZ is compensated for via the pressure supply DV in such a way that if volume is lost from the master brake cylinder, volume is supplied to the master brake cylinder from the pressure supply, or if volume is increased in the master brake cylinder SHZ/HZ, volume is removed from the master brake cylinder from the pressure supply until the actual pressure equals the target pressure. Valve 9 is then closed and valves SV2*k*1, . . . , SV2*k*4 are opened. The pressure supply DV is now used again for the brake pressure control in the wheel brake cylinders RZ1, . . . , RZ4 until the difference between the actual pressure and the target pressure again exceeds the selectable limit value, after which the process of the fallback level is repeated. The brake pedal characteristics and brake pedal feel remain largely normal as a result. However, the brake pedal may vibrate slightly.

The following table lists reference values for the diagnosis:

| Event | Approximate value |
|---|---|
| Maximum volume flow for the pressure supply from TTL requirement | $QDV_{max} = 66$ cm$^3$/s = 6.6 cm$^3$/100 ms = 1.2 cm$^3$/20 ms TD (TD = diagnosis time = 20 ms) |

-continued

| Event | Approximate value |
|---|---|
| Note: TTL stands for "Time To Lock" and is the shortest time in which 100 bar brake pressure is reached in the wheel brake cylinders. A typical requirement is: TTL = 150 ms | |
| Maximum volume flow through a SV2k valve (from TTL requirement): | $QSV2k_{,\,max}-$ 22 cm³/s = 2.2 cm³/100 ms = 0.44 cm³/20 ms TD |
| Volume flow SV2k with dirt particles in the valve seat (leakage flow $QSV2k_{,\,leck}$) at 50 bar differential pressure across the valve: | $QSV2k_{,\,leak}$ = 8 cm³/s = 0.8 cm³/100 ms = 0.16 cm³/20 ms TD |
| Volume flow EV with dirt particles in the valve seat (leakage flow $QEV_{,\,Leck}$) at 50 bar differential pressure across the valve: | $QSV_{,\,leck}$ = 8 cm³/s |
| Volume flow RV from the EV with dirt particles in the valve seat (leakage flow $QRV_{,\,leck}$) at 50 bar differential pressure across the valve: | $QRV_{,\,leck}$ = 12 cm³/s |
| DV piston surface | Ak = 4.4 cm² |
| DV piston displacement for volume displacement of 0.16 cm³ | Sk = 0.4 mm |
| DV piston speed with leakage flow $QSV2k_{,\,leck}$ | $Vk_{Leck}$ = 0.4 mm/20 ms TD |

LIST OF REFERENCE SYMBOLS 1 sensor element
2 Target in the float
3 Return line to the VB
4 DV specific valve circuit
5 Single-circuit pressure supply
6 Anchor 6/6a
7/7a Valve tappet
8 Valve seat
9 Disconnect valve
RZ1-RZ4 Wheel brake cylinder
BK1/BK2 Braking circuits
RK1 Wheel circuit 1
RK2 Wheel circuit 2
RK3 Wheel circuit 3
RK4 Wheel circuit 4
HCU Complete hydraulic unit with DV and valves
VB Storage container
HL1-HL4 Hydraulic lines outside the HCU to the data center
HL5 Hydraulic lines from SHZ to BV KTV Circuit separating valve
DV pressure supply
DG Pressure transmitter
EM1/2 electric magnetic circuit ½
EIV Electric valve actuation
elEM Electric motor control of the electromechanical brake
9 Permanent magnet
10 Pole plate
11 Electromagnetic inference
12 Plastic body
13 Return spring
SV2k currentless open solenoid valve without non-return valve with an additional power device

What is claimed is:
1. A brake system including:
at least two wheel brake cylinders, which are each part of separate wheel circuits, respective hydraulic connection lines connected to respective ones of the at least two wheel brake cylinders and also forming parts of respective ones of the separate wheel circuits,
at least one pressure supply, which serves at least to build up pressure in the at least two wheel brake cylinders,
at least one reservoir,
at least one electronic control and regulating unit,
switching valves, wherein each of the at least two wheel brake cylinders is connected via its respective hydraulic connecting line to a respective one of the switching valves, which serves to disconnect and connect the respective hydraulic connection of the respective wheel brake cylinder and at least one further hydraulic main line, via which the respective switching valve is enabled to be connected at least to the at least one pressure supply,
wherein diagnoses of respective leakages of the individual wheel circuits are carried out, and wherein, depending on the diagnostic results, an electronic control and regulating unit of the at least one electronic control and regulating unit decides whether a given wheel circuit is switched off by permanently closing the associated switching valve of the given wheel circuit or continues to be operated to generate a braking effect.

2. The brake system according to claim 1, wherein a degree of leakage or a leakage flow in a respective one of the wheel circuits is determined using one or more of the following methods a) to e):
a) determination of a required quantity of hydraulic fluid which must be supplied in addition to a predetermined quantity of fluid by means of the at least one pressure supply in order to achieve a set pressure in the respective wheel circuit;
b) determination of a determined absolute pressure drop and/or pressure drop gradient in the respective wheel circuit;
c) determination of a pressure deviation from a target pressure value during pressure build-up in the respective wheel circuit, in that a predetermined quantity of fluid is conveyed into the wheel circuit to achieve the target pressure and an actual pressure is then determined;
d) diagnosing leakage in the respective wheel circuit by measuring pressure over time in the hydraulic main line connecting the switching valve of the respective wheel circuit and the at least one pressure supply during pressure build-up by means of the at least one pressure supply or when the at least one pressure supply is switched off; or
e) measurement of an intake volume of the respective wheel circuit via the at least one pressure supply to achieve a target pressure, the intake volume being determined by means of the at least one pressure supply via current measurement of a drive motor of a pressure supply of the at least one pressure supply and/or the piston travel of a piston of the pressure supply of the at least one pressure supply.

3. The brake system according to claim 1,
wherein when an upper limit value or limit value range of a leakage of a given wheel circuit is exceeded, the respective associated switching valve of the given wheel circuit is permanently closed, and
wherein below the upper limit value and above a lower limit value a time-limited and/or permanent additional delivery takes place to achieve a brake pressure to be set in the respective wheel brake cylinder of the given wheel circuit.

4. The brake system according to claim 3, where that the upper limit value is determined by a maximum delivery rate of the at least one pressure supply for increasing the brake pressure in the given wheel circuit.

5. The brake system according to claim 4, wherein, in the event of a leakage flow of 50-90% of a maximum delivery capacity of the at least one pressure supply, the leakage flow is compensated by means of the at least one pressure supply by means of additional delivery.

6. The brake system according to claim 3, wherein, in order to optimize braking effect and driving stability, an electronic control and regulating unit of the at least one electronic control and regulating unit determines whether and which leaking wheel circuit(s) is/are switched off by permanently closing the respective switching valve(s) associated with the leaking wheel circuit(s).

7. The brake system according to claim 1, wherein an exhaust valve belonging to a wheel brake cylinder is a component of the respective wheel circuit that includes the wheel brake cylinder.

8. The brake system according to claim 1, wherein the brake system further includes a brake pedal acting mechanically on a master brake cylinder or an electronic brake pedal for a brake-by-wire brake system.

9. The brake system according to claim 1, wherein single faults, double faults and a leakage rate in the brake system are detected by means of the diagnoses.

10. The brake system according to claim 1, wherein no non-return valves are connected in parallel with the respective switching valve.

11. The brake system according to claim 1, wherein when a certain leakage flow in at least one wheel circuit or a sum of all determined leakage flows is exceeded, the brake system emits a warning message that at least one of the wheel circuits has failed.

12. The brake system according to claim 1, wherein a pressure-volume characteristic of a respective wheel circuit is taken into account in diagnosing a leak in the respective wheel circuit.

13. The brake system according to claim 1, further including a maximum of two further switching valves arranged in the respective hydraulic connecting line between the pressure supply and a given one of the switching valves.

14. The brake system according to claim 1, further including one or two first further switching valves disposed in the hydraulic switching line associated with a respective one of the switching valves associated with a respective one of the wheel circuit between the at least one pressure supply and the respective one of the switching valves of, and wherein only one of the first further switching valves is arranged in the hydraulic connecting line between the at least one pressure supply and at least one second further switching valve of another one of the wheel circuits.

15. The brake system according to claim 1, wherein all wheel circuits belong to one brake circuit and are connected via a common hydraulic main line either:

a) to a single working chamber of a plunger system of the at least one pressure supply or are separable from the working chamber via at least one valve, or b) are connected or are connectable to both working chambers of a double-acting piston-cylinder system of the at least one pressure supply whereby a pressure reduction and/or pressure build-up is enabled to take place in at least one wheel circuit in both stroke directions of the double-acting piston.

16. The brake system according to claim 1, wherein two of the wheel circuits belong to a given brake circuit wherein the given brake circuit includes a hydraulic brake circuit lines.

17. The brake system according to claim 16, wherein the brake system includes two brake circuits enabled to be hydraulically connected to one another or hydraulically separated from one another via a circuit separation valve.

18. The brake system according to claim 17, wherein each brake circuit is connected or is enabled to be connected via a separate hydraulic line to a respective working chamber of a double-acting piston-cylinder system of the at least one pressure supply.

19. The brake system according to claim 7, wherein at least one of the at least two wheel brake cylinders, is assigned an exhaust valve or only one single exhaust valve is provided for the brake system.

20. The brake system according to claim 15, wherein at least one of the wheel brake cylinders is or are each assigned an exhaust valve.

21. The brake system according to claim 1, wherein, in addition to the diagnoses of the wheel circuits, a) a diagnosis of the function and/or tightness of valves arranged between the switching valves and the at least one pressure supply is carried out and/or b) a diagnosis of the function and/or tightness of the switching valves is carried out, and/or c) a diagnosis of the function and/or tightness of the at least one pressure supply is carried out.

22. The brake system according to claim 1, wherein, in order to diagnose leakage in one or more of the wheel circuits, all switching valves of all wheel circuits are first opened and the at least one pressure supply is used to set a target pressure in the wheel circuits, with an actual pressure being compared with the target pressure to obtain a deviation, wherein, if a certain deviation value is exceeded, a further diagnosis of the individual wheel circuits is carried out one after the other until either a) a leak that matches the deviation between the actual pressure and the target pressure, is determined for a particular one of the wheel circuits or b) all wheel circuits are checked for leaks one after the other.

23. The brake system according to claim 22, wherein, in order to check the leakage of an individual wheel circuit, all switching valves of all wheel circuits of one or all brake circuits are first closed, followed by opening of the switching valve belonging to the individual wheel circuit in order to then either a) set a target pressure in the individual wheel circuit or its brake cylinder by means of the at least one pressure supply, wherein an actual pressure is obtained using a pressure sensor and/or based on a measured drive current of a drive motor of the at least one pressure supply, wherein on the basis of a deviation from the determined target pressure and the determined actual pressure, a degree of leakage is determined or estimated, or b) not to change the pressure by means of the at least one pressure supply and to determine the actual pressure in the respective wheel circuit or brake circuit by means of a pressure sensor, wherein a degree of leakage is determined or estimated based on a determined pressure drop.

24. The brake system according to claim 1, wherein the at least one pressure supply has an electromotive drive which
  a) drives a piston-cylinder system with either
  aa) a single-stroke piston and a working chamber or
  bb) a double-stroke piston with two working chambers, or
  b) drives a rotary pump.

25. The brake system according to claim 24,
  wherein when a rotary pump or a piston pump is used for the at least one pressure supply, a solenoid valve or a non-return valve is provided to isolate a pressure outlet of the pump from one or more brake circuits comprising one or more associated ones of the wheel circuits.

26. The brake system according to claim 25,
  wherein pressure reduction takes place via outlet valves assigned to the wheel brake cylinders, one, two or more outlet valves being opened to achieve a target gradient of the pressure reduction.

27. The brake system according to claim 1, wherein diagnosis for testing the leakage in the brake system or in the individual wheel circuits is enabled to take place at one of the following times or driving situations:
  a) during braking,
  b) while the vehicle is stationary or at speeds below a maximum speed,
  c) at specific time intervals, or
  d) each time the vehicle is started.

28. The brake system according to claim 1, wherein
  a) during the diagnosis, each wheel circuit of the brake system is checked for failure,
  and/or
  b) an actual piston position of the at least one pressure supply and an actual pressure in the brake system are used in the diagnosis, and/or a stored pressure-volume characteristics of the brake system and/or the wheel circuits is/are used in the diagnosis,
  and/or
  c) a target piston position of the at least one pressure supply is derived from the actual pressure in the brake system using the pressure-volume characteristics,
  and/or
  d) a malfunction of the brake system is derived from a difference between the actual piston position and a target piston position,
  and/or
  e) in the event of a malfunction due to leakage, a leakage volume flow is equalised by appropriate additional delivery by means of the at least one pressure supply.

29. The brake system according to claim 1, wherein the at least one hydraulic main line is hydraulically connected to one or each working chamber of a master brake cylinder, wherein this/these connection(s) are able to be interrupted by means of one or two further switching valves.

30. The brake system according to claim 1, wherein at least one brake circuit associated with one or more of the wheel circuits is enabled to be disconnected from the at least one pressure supply by means of one or two further switching valves.

31. The brake system according to claim 1, wherein the switching valves comprise electromagnetic switching valves, and wherein the electromagnetic switching valves and/or one or more drives of the at least one pressure supply have at least double-redundant windings and/or controls.

32. The brake system according to claim 1, wherein the wheel circuits are distributed over two brake circuits, wherein the two brake circuits are connected by means of a hydraulic line, which can be shut off by means of a circuit isolating valve, wherein a first brake circuit of the two brake circuits is permanently connected to the at least one pressure supply without an interposed solenoid valve, and wherein a second brake circuit of the two brake circuits is connected to a master brake cylinder via a hydraulic connection, wherein this hydraulic connection is enabled to be shut off by means of a normally open switching valve.

33. The brake system according to claim 1, wherein the brake system has
  a) exclusively purely hydraulically acting wheel brake cylinders
  b) both purely hydraulically acting wheel brake cylinders and electromotor-actuated wheel brakes.

34. The brake system according to claim 1, wherein the braking system has an anti-lock braking system and/or an electronic stability program or simulates one or both of these.

35. The brake system according to claim 1, wherein if at least one wheel circuit fails when a yaw moment occurs, a yaw moment control of an electronic stabilization system is used or intervenes in pressure control.

36. The brake system according to claim 32, wherein a change in volume in the master brake cylinder due to leakage of the master brake cylinder or leakage of the normally open valve, is detected by ongoing comparison of a target pressure in the master brake cylinder, which is derived from a measured pedal travel, with an actual pressure in the master brake cylinder, and/or wherein, if a selectable limit value is exceeded, compensation of the change in volume is carried out by means of the at least one pressure supply in order to maintain normal brake travel, with the actual pressure in the master brake cylinder, and/or if a selectable limit value is exceeded, compensation of the volume change is carried out by means of the at least one pressure supply to maintain normal brake pedal characteristic, whereby pressure control in one or more of the wheel brake cylinders is stopped during the compensation.

37. The brake system according to claim 1, wherein no further valves are provided between the switching valves assigned to the wheel circuits and the at least one pressure supply.

38. A switching valve for the brake system according to claim 1, wherein the switching valve is a solenoid valve with an electromagnetic drive, via which a valve actuator or valve tappet is enabled to be adjusted between an open valve position and a closed valve position, wherein the switching valve further includes a force-adding device which exerts a force on the valve actuator or valve tappet by means of its own magnetic field.

39. The switching valve according to claim 38, wherein the switching valve has a return spring which exerts a force on the valve actuator or the valve tappet which prevents the valve from tearing.

40. The switching valve according to claim 38, wherein the switching valve is a de-energized open valve or a de-energized closed valve, where de-energized means that the electromagnetic drive is not energized.

41. The switching valve according to claim 38, wherein the force of the additional force device can be generated or is generated by means of an electromagnet and/or a permanent magnet that can be energized.

42. The switching valve according to claim 40, wherein the force of the force-adding device is directed in an opposite direction to a force of the electromagnetic drive.

43. The switching valve according to claim 42, further including a return spring, wherein the force of the force-adding device is equivalent to a force of the return spring.

44. The switching valve according to claim 38, wherein the force is only generated with the additional force device by energizing a coil if a state of the brake system indicates that the switching valve is likely to be closed unintentionally.

45. The switching valve according to claim 38, wherein the electromagnetic holding force is diagnosed via a current strength and movement of an armature by means of diagnostic functions.

\* \* \* \* \*